United States Patent [19]

Lecron et al.

[11] Patent Number: 4,469,499
[45] Date of Patent: Sep. 4, 1984

[54] METHOD AND APPARATUS FOR THE MANUFACTURE OF FIBERS

[75] Inventors: Jacques Lecron, Challes les Eaux; Maxime Manera, Jacob Bellecombette; Jean-Paul Faure, Chignin; Jean-Pierre Renaudin, Cognin, all of France

[73] Assignee: Societe Vetrotex Saint-Gobain, Chambery, France

[21] Appl. No.: 491,056

[22] Filed: May 3, 1983

Related U.S. Application Data

[63] Continuation-in-part of Ser. No. 377,903, May 13, 1982, Pat. No. 4,391,618, and Ser. No. 374,272, May 3, 1982, Pat. No. 4,398,933, which is a continuation-in-part of Ser. No. 207,712, Nov. 17, 1980, abandoned, said Ser. No. 377,903, is a continuation of Ser. No. 207,712.

[51] Int. Cl.³ .......................................... C03D 37/085
[52] U.S. Cl. ............................................... 65/1; 65/2; 65/12; 264/169; 425/72 S
[58] Field of Search .................. 65/1, 2, 12; 264/169; 425/72 S

[56] References Cited

U.S. PATENT DOCUMENTS

| | | | |
|---|---|---|---|
| 2,947,027 | 8/1960 | Slayter | 65/1 |
| 3,475,147 | 10/1969 | Stalego | 65/1 |
| 3,574,581 | 4/1971 | Strickland et al. | 65/1 |
| 3,697,241 | 10/1972 | Strickland et al. | 65/2 |
| 3,905,790 | 9/1975 | Strickland | 65/1 |
| 3,979,195 | 9/1976 | Strickland | 65/1 |
| 3,982,915 | 9/1976 | Coggin | 65/1 |
| 3,988,135 | 10/1976 | Coggin | 65/1 |
| 4,032,314 | 6/1977 | Coggin | 65/1 |
| 4,033,742 | 7/1977 | Nichols et al. | 65/2 |
| 4,088,467 | 5/1978 | Shono et al. | 65/2 |
| 4,318,680 | 3/1982 | Pfeiffer et al. | 425/382.2 |
| 4,328,015 | 5/1982 | Melan et al. | 65/2 |
| 4,330,311 | 5/1982 | Jensen | 65/1 |
| 4,330,312 | 5/1982 | Hill | 65/1 |
| 4,332,602 | 6/1982 | Jensen | 65/12 |
| 4,343,635 | 8/1982 | Kim et al. | 65/1 |
| 4,349,364 | 9/1982 | Morrison | 65/2 |
| 4,351,656 | 9/1982 | Jensen | 65/1 |
| 4,391,618 | 7/1983 | Lecron et al. | 65/1 |
| 4,398,933 | 8/1983 | Lecron et al. | 65/1 |
| 4,401,451 | 8/1983 | Lecron et al. | 65/1 |

FOREIGN PATENT DOCUMENTS

| | | |
|---|---|---|
| 7500601 | 8/1976 | France . |
| 763160 | 12/1956 | United Kingdom . |

Primary Examiner—Robert L. Lindsay, Jr.
Attorney, Agent, or Firm—John T. Synnestvedt; Charles H. Lindrooth

[57] ABSTRACT

A process and apparatus is disclosed for forming fibers from attenuable materials, such as molten glass, by attenuating streams of glass from the bottom of a bushing wherein the bottom has downwardly presented wall portions at upper and lower levels. According to the disclosure the upper or lower wall portions are formed into series of bosses, each having a multiplicity of orifices in the lower ball portions. Bosses with alveoles are disclosed. Filamentary material is manufactured by drawing at least one filament from each boss independently of each other boss or from separate fiber forming regions in each boss regardless of whether or not the material has flooded the bottom surface of any boss. Embodiments with one alveole per boss or plural alveoles per boss are disclosed. Where plural alveoles per boss are provided, shallow transverse grooves in the lower wall portions of the bosses may be used to separate the orifices of one alveole from the orifices of adjacent alveoles. Controlled cooling permits the selective drawing of one or a plurality of filaments from each alveole.

22 Claims, 30 Drawing Figures

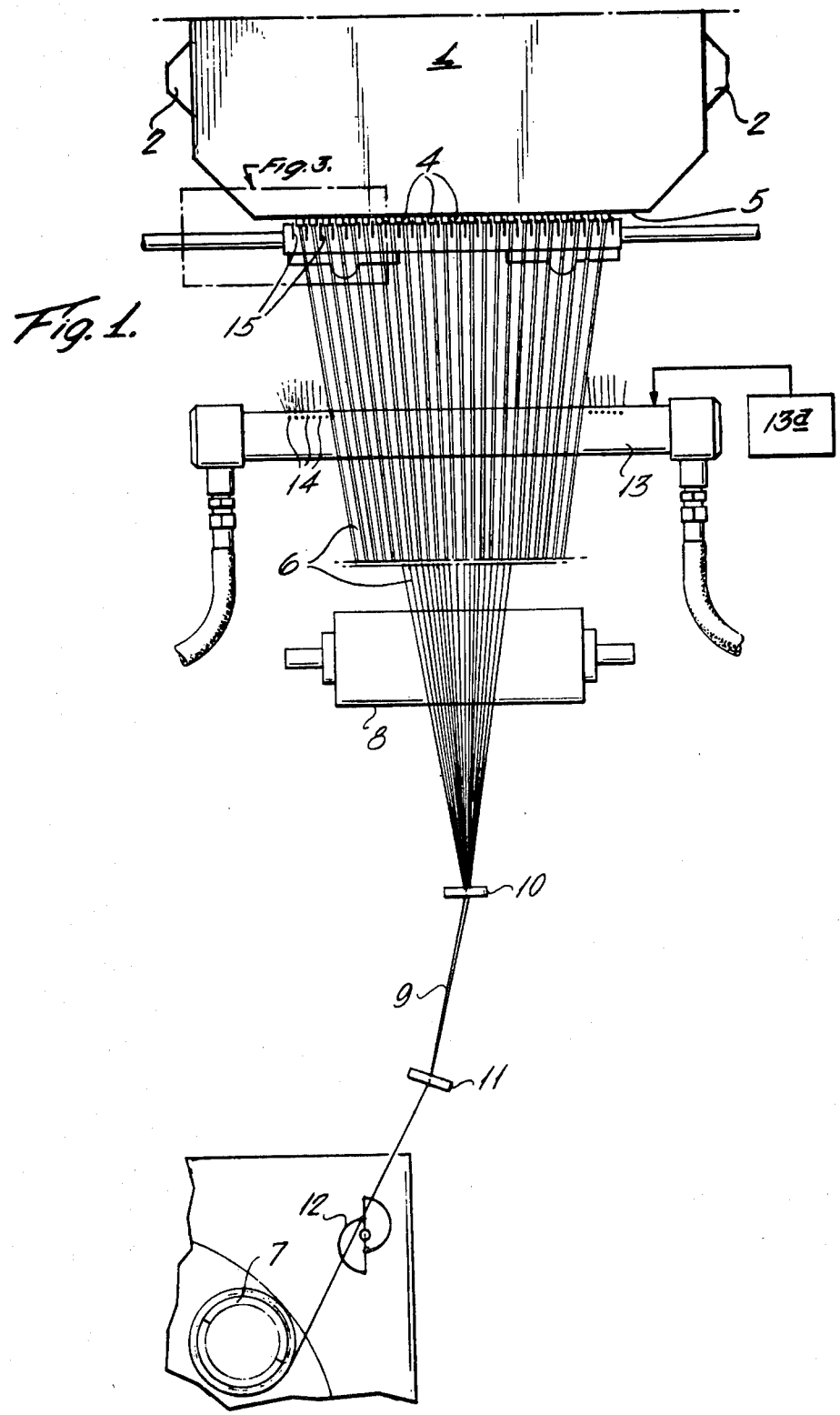

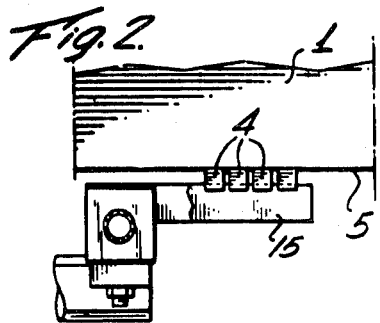
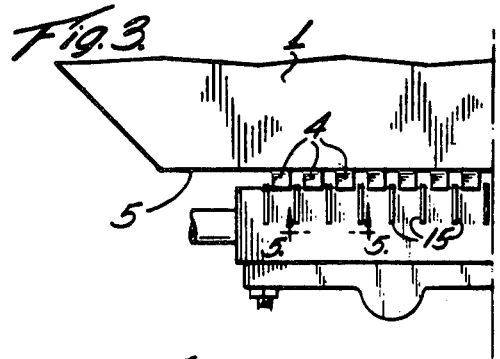
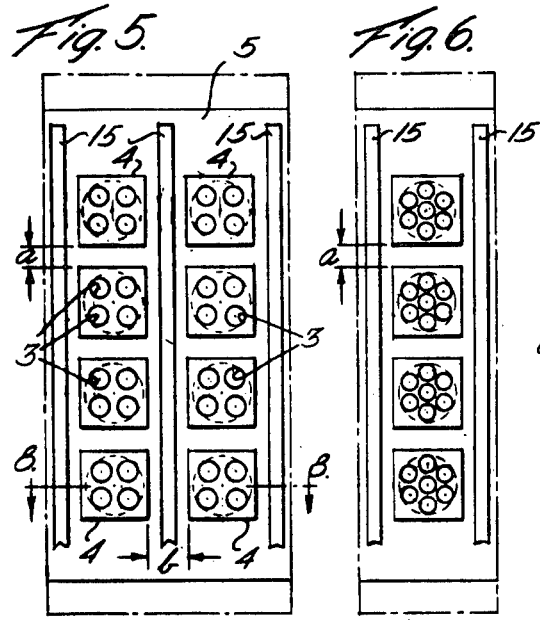
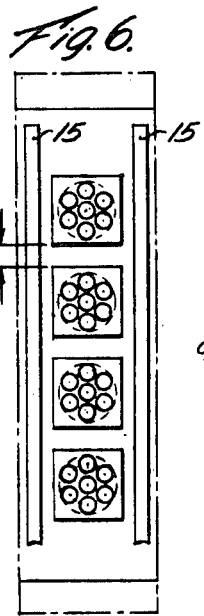
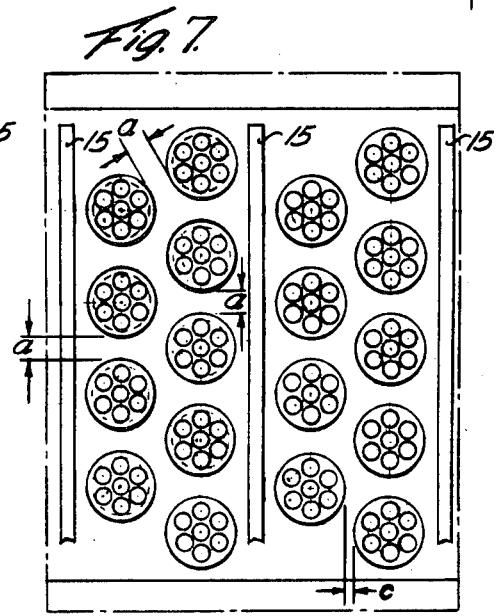
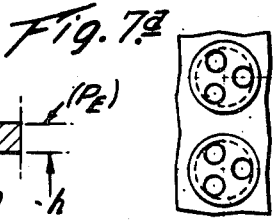
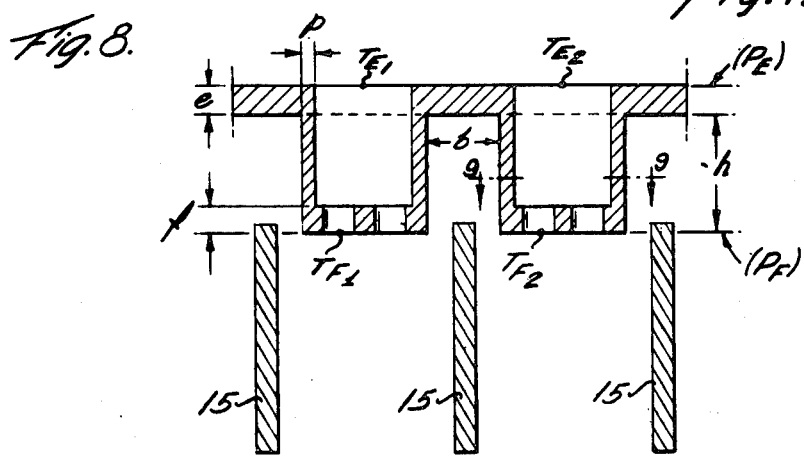

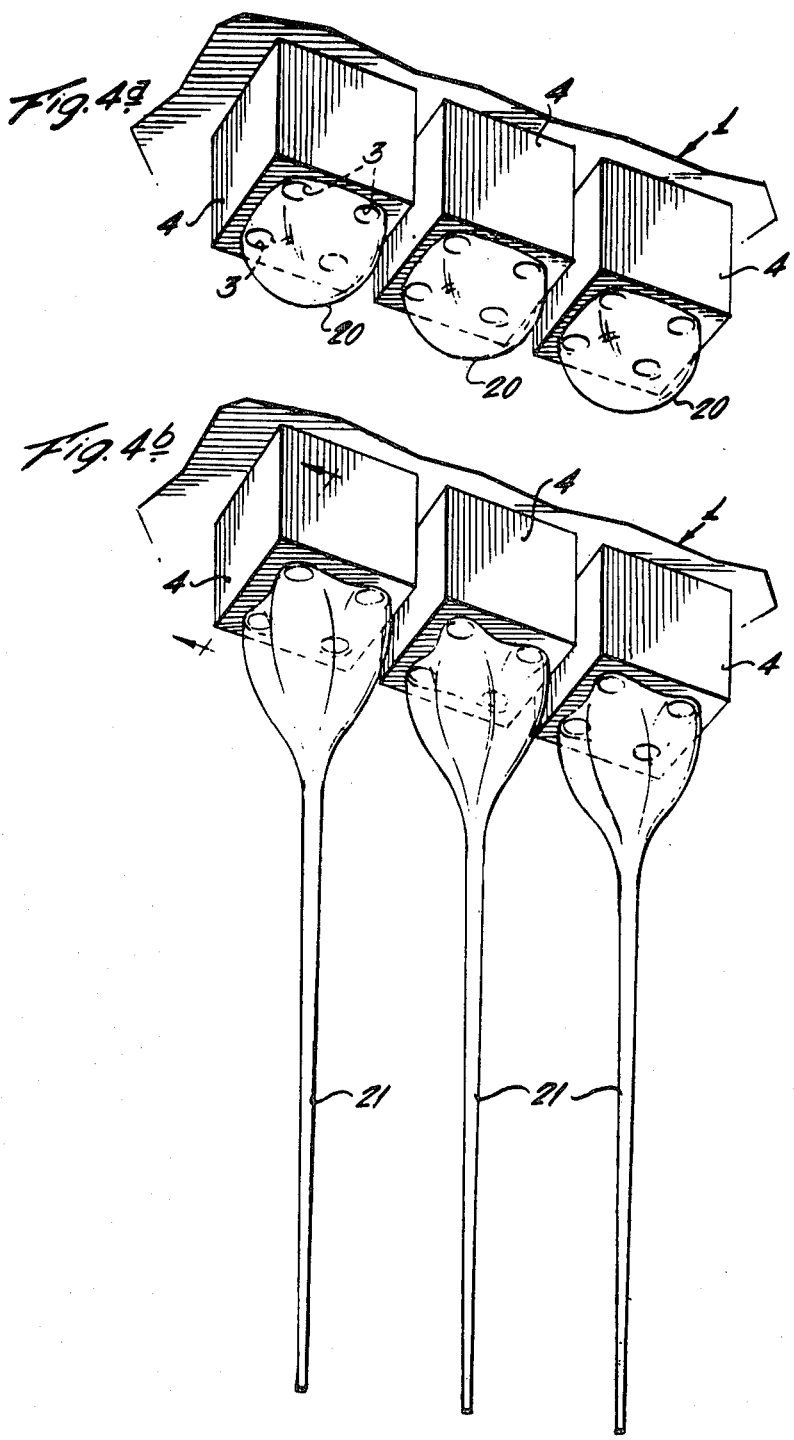

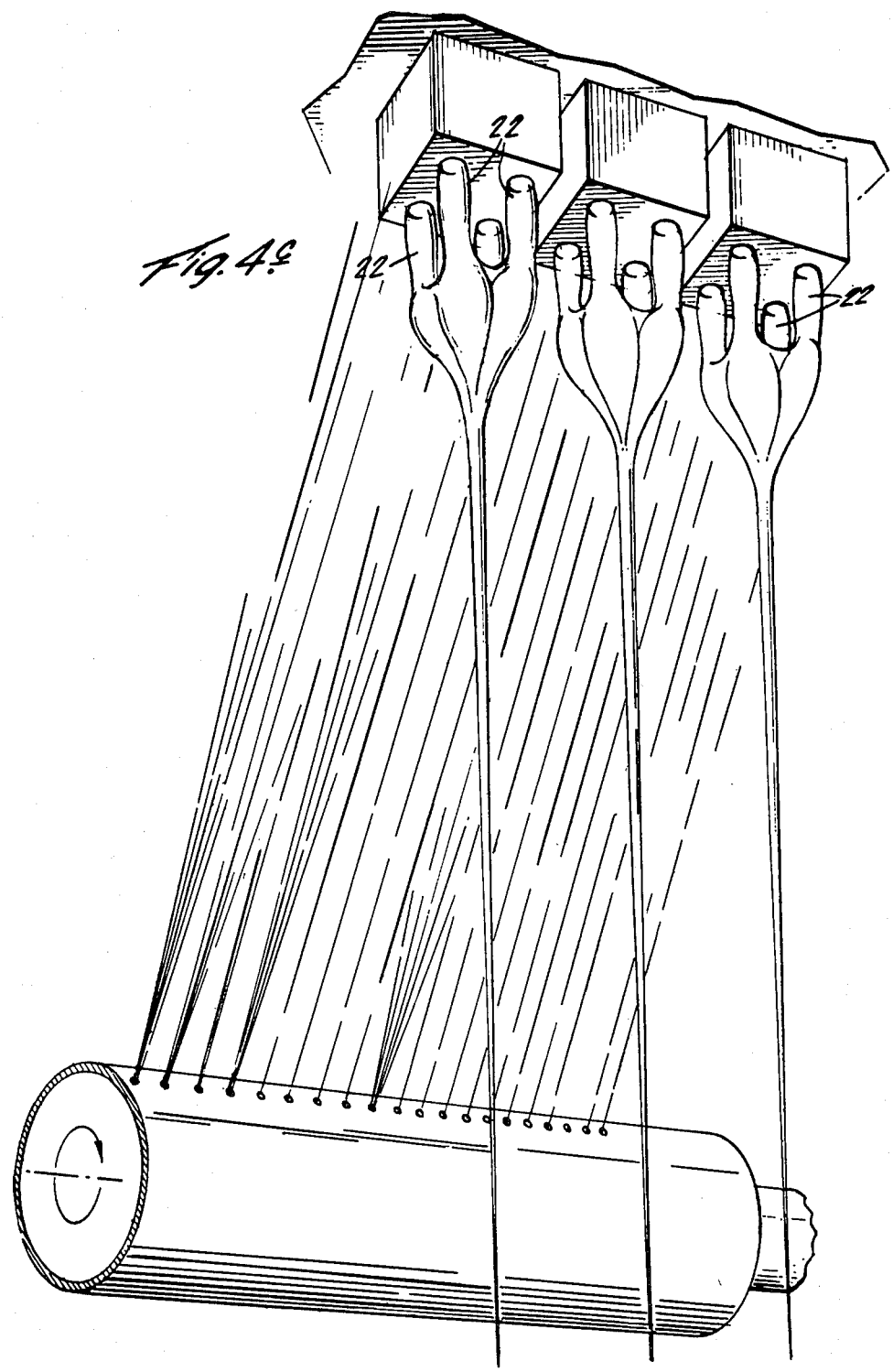

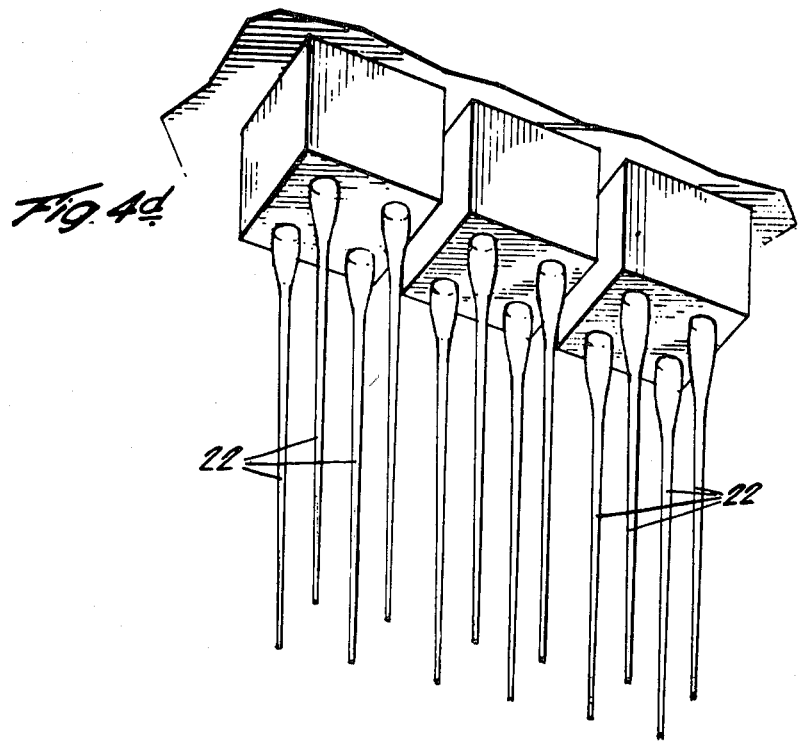
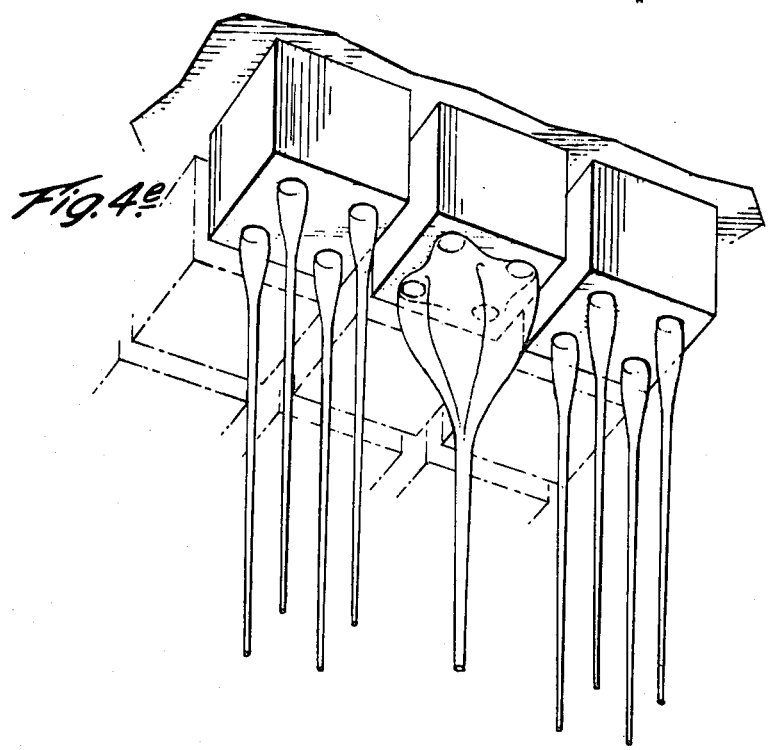

METHOD AND APPARATUS FOR THE MANUFACTURE OF FIBERS

RELATED APPLICATION

This application is a continuation-in-part of application Ser. No. 377,903 filed May 13, 1982 now U.S. Pat. No. 4,391,618 granted 7/5/83 which in turn is a continuation of application Ser. No. 207,712 filed Nov. 17, 1980 now U.S. Pat. No. 4,391,618 granted 7/5/83. This application is also a continuation-in-part of application Ser. No. 374,272 filed May 3, 1982 now U.S. Pat. No. 4,398,933 granted 8/16/83 which is a continuation-in-part of the said application Ser. No. 207,712 abandoned.

FIELD OF THE INVENTION

The present invention relates to process and apparatus for the manufacture of fibers from attenuable materials, especially mineral materials, such as glass, by attenuating the material in attenuable condition at the exit of orifices in the bottom of a bushing and in particular to the use of bushing bottoms having a high density of orifices. In particular, it concerns the manufacture of continuous fibers by the mechanical attenuation of streams into filaments which are gathered into strands which are generally wound onto a support.

BACKGROUND AND THE PRIOR ART

The most commonly used procedure for the manufacture of continuous fiber product, such as strand, consists of drawing streams of attenuable material in attenuable condition, such as molten glass, from a bushing, the base of which is equipped with orificed tips. When cooling means are associated with the tips, stable separation of the streams is enhanced. The tips tend to minimize the phenomenon of "flooding" of the bushing base particularly at the time of a filament rupture during the fiberization operation. This flooding is manifested by the tendency of the molten material issuing from an orifice to spread over the surrounding undersurface of the base plate because of capillary action and the wetting effects of the plate. At the moment of filament rupture during the fiberization operation, the presence of tips tends to reduce the massive flooding of the base plate which would otherwise occur.

Taking into account the difficulties in manufacturing a bushing base with tips and also the significant space occupied by the tips, various efforts have been made to eliminate them and to replace the tipped bushing base with a generally flat perforated plate having a large number of orifices within a given surface area. The result of these efforts is the simultaneous attenuation of a larger number of filaments per bushing and consequently the possibility of the manufacture of new products, and a reduction in deformation problems of the bushing base which become progressively more significant as bushing surface area becomes larger.

Nevertheless, the advantage of an increase in the number of orifices per surface unit of the plate is, in practice, rapidly reduced by the flooding problem which occurs at the time of a filament rupture and which is produced much more easily since the distances between adjacent orifices are smaller, and the fiberization conditions, particularly the temperatures adjacent to the orifices of the plate, are less stable or less uniform.

In order to economically use bushings having a large number of orifices at a high density, and to achieve greater production capacity than that of the standard installations, it has been regarded as necessary to separate easily the glass into as many filaments as there are orifices, and to maintain this separation during the entire fiberization operation.

Various kinds of apparatus and processes have been proposed in efforts to obtain good fiberization stability with orificed plates, to decrease the number of filament ruptures and the risk of partial or total flooding of the plate, since flooding generally leads to lengthy delays in order to restart the fiberization operation. Among the various patents granted in this field, U.S. Pat. No. 3,905,790 is representative. This patent describes a flat-base bushing having a large number of orifices per unit of the surface and on the order of 30 orifices per $cm^2$ or more. The formation of the filaments and maintenance of their separation requires a precise control of the temperature of the bushing base, by regulating the electrical energy provided and cooling it with a relatively large volume gas current continuously blown at high speed. The force of the gas blowing against the bushing base may cause breakage of fibers particularly when small diameter fibers are being drawn. Moreover, some turbulence of gas flow is inevitable and this turbulence leads to lack of uniformity in temperature on the base. This lack of uniformity introduces differences in viscosity of the glass being drawn from the orifices which leads to fiber breakage and differences in fiber diameter in fibers drawn from different orifices. Numerous modifications intended to solve the problems which have arisen when attempts are made using this technique have been proposed.

One modification described in French patent No. 2,297,194, consists of establishing and maintaining a significant temperature differential between the glass adjacent to the plate and the outer surface of the plate. The temperature of the plate is maintained at a temperature which is 28° to 83° C. lower than the temperature of the glass and this was found to reduce the tendency of the glass to flood. The temperature differential is obtained by a constant high volume and high velocity blowing of air on the bushing base.

Another modification, described in U.S. Pat. No. 4,033,742, consists of constantly blowing a high volume of high velocity cooling air from two series of delivery jets placed on both of the longer edges of the plate forming the bushing base. The delivery jets, which form an angle between 30° and 60° in relation to the plate, are placed at a distance from the center of the said plate which is between 5 and 127 cm, and release air jets at speeds of about 30 to 120 m/sec. The flow of air reaching the orifices is intended to be more uniform and an excessive consumption of air is intended to be avoided.

In spite of the modifications made, these attempts to eliminate tips suffer certain disadvantages which arise because of the use of blowing gas. In particular, it is difficult to obtain relatively uniform temperatures over the entire group of orifices and a constant and uniform cooling of the glass cones issuing from the orifices. In the case of flooding of the flat base, for instance after filament rupture, the restart of fiberization is still a long and complicated procedure. In effect it is necessary after complete flooding of the bottom of the bushing to increase the gaseous flow to obtain solidification of the glass, to thereafter proceed with alternate reductions and increases in the gaseous flow to gradually reduce flooding. All these operations readily result in thermal imbalance of the bushing, harmful to its proper operation. This type of process is all the more difficult if not impossible to implement when very small diameter fibers are intended to be manufactured since the force of the gas currents tends to fracture the tiny fibers. Furthermore, the fiberization apparatus is fairly complicated due to the presence of equipment for the supply of gas and of the system for regulating the various parameters relative to the gas blowing.

In an effort to decrease the tendency to flood the bushing, French patent No. 2,128,312 describes a process according to which a special gaseous mixture is directed toward the bushing base, whether it is made as a flat plate with orifices or as a plate having parallel, longitudinal channels perforated with a row of orifices. This process consists of continuously emitting an inert or nonoxidizing gas and a hydrocarbon gas which is decomposed by heat in order to deposit carbon and cause an adsorption of hydrogen on the bushing base. The carbon deposit, which results from the chemical decomposition of the gases in contact with the hot glass and hot bushing base, is supposed to decrease the wetting of the base by the glass, and tends to counteract the joining of the glass cones which are formed at each orifice. The complexity of the apparatus, which comprises perforated or porous tubular parts for the distribution of the gases and an entire supply system for the inert and hydrocarbon gases as well as the character of the gases utilized, prohibitively increase the cost of the fiberization installations.

Furthermore, the formation of glass fibers in a reducing environment in the presence of fine carbon particles can cause a degradation of the properties of the fibers.

Other proposals have been made, particularly in an effort to control the development of flooding after the rupture of a filament.

One such proposal is shown in U.S. Pat. No. 3,979,195 which connects each orifice to at least two adjacent orifices by fine grooves on the underside of the perforated plate. Hence, during the rupture of a filament, the glass is intended to flow in a groove to supply the filament drawn from one of the adjacent orifices. The filament, thickened by this application of glass, separates into two by the action of a jet of air permanently blown on the bushing base.

Besides the disadvantages of the permanent blowing of gas already mentioned, this system is delicate to implement. In effect, if the glass running through the channel is too cool, there is risk that when it contacts the adjacent cone it will cause a rupture of the adjacent filament, which will lead to an uncontrolled localized flooding; if the glass is too hot, the reduction in its viscosity increases the risk that it will migrate outside the channel and cause an equally uncontrollable flooding.

Another proposal is found in U.S. Pat. No. 3,982,915, which shows a modification of the structure shown in the patent identified just above. According to this patent, the orifices are perforated in a flat plate and arranged in zones containing several dozen orifices. At the heart of each zone the orifices are closely paired in groups of two or three, for example identified as a, b, and c in the patent.

When a filament descending from "a" is accidently broken, the glass flowing through "a" wets the metal separating the three orifices, preferably supplies the cones descending from "b" and "c", and is carried along by the latter two. With the permanent jet air action directed to the bushing base, a separation into three filaments re-occurs.

All the disadvantages inherent in the permanent blowing of a gas and in the very localized variations in the viscosity of the glass, possibly leading to a chain-reaction rupture or to an uncontrolled flooding are again present. In addition the start-up operation of the bushing initially requires the total flooding of the perforated base plate and it follows that the subdivision into filaments is long and delicate.

Another approach is disclosed in U.S. Pat. No. 3,574,581 which illustrates in FIGS. 8 and 9 a thin dimpled sheet 50 affixed to a base such as waffle plate 51. The dimples are said to be in the shape of sections of spheres and have one or a cluster of orifices (7 to 50) extended through each dimple. According to this patent glass under pressure in liquid form is extruded through the orifices preferably by means of a viscosity pump. Heating is provided by either heating of manifold 10, or the waffle plate 51. There is no joule effect heating of the dimpled sheet 50. Fibers are principally formed by extrusion and not by attenuation. The bushings are intended to be small as compared with prior art bushings (Col. 6, Line 37) and pressures of several hundred p.s.i. are contemplated.

Another more recent approach is shown in Belgian patent No. 876,072 of May 7, 1979. This patent discloses what amount to tips of cubical external configuration formed by machining grooves at right angles to each other into the base of the bushing. The patent states that it is essential that jets of air be blown against the bushing base.

From the foregoing it will be seen that, in the prior art, numerous techniques have been proposed for attempting to reduce the tendency towards flooding of the bushing, and thereby attempting to reduce the problems of establishing fiberization after such flooding.

SUMMARY AND OBJECTS OF THE INVENTION

In accordance with the present invention, instead of working toward reducing the tendency towards flooding, provision is made for obtaining a controlled and stable flooding, confined to a well defined area, perforated with a plurality of orifices arranged to facilitate restarting and using operating conditions such that fiberization of the glass may proceed selectively either into a single fiber from said area or to plural fibers therefrom. The system is designed to function either with or without such flooding. Indeed, the present invention provides for alternative operation of a given bushing under two different fiberizing conditions, in one of which individual fine filaments are drawn from individual orifices, and in the other of which larger single filaments are controllably drawn from groups of flooded orifices. In this way, the invention makes possible the use of a given bushing for production of different sizes of fibers, or different types of products, either simultaneously or sequentially. For example, a bushing may be used to produce a strand made of fibers of different sizes or after manufacture of a strand of one fiber size, the bushing can be used to produce strand comprising fibers of a different size. Since this is accomplished according to the present invention in a manner establishing control of flooding, many collateral advantages result including the practicality of employing bushings having increased numbers of orifices, closer spacing of orifices, and smaller orifices.

Another objective of the present invention is to increase the number of orifices per unit of surface area and the total number of orifices per bushing, in order to obtain strands made up of numerous elementary filaments, while maintaining good fiberization stability, even for the manufacture of filaments of small diameter.

These factors, namely the increase in the number of orifices and the improved fiberization stability, result in a reduction in the number of filament ruptures and therefore a considerable increase in the manufacturing yield.

A further embodiment of the invention has as an object a combination of the advantages of the channel configurations disclosed in U.S. Pat. No. 4,328,015 and the series of bosses each housing alveoles.

Among other objects and advantages of the alternate embodiment of the invention are the provision for increases in the density of orifices, simplification of construction of bushing bottoms, a further reduction of unintended flooding by an increase in the thermal inertia of the bushing and also improved electrical conductivity in bushings heated by the joule effect.

These and other objectives are achieved by the employment of novel forms of bushings and operating methods as fully described herebelow.

Briefly, the invention contemplates delivering attenuable material in attenuable condition through series of downwardly projecting bosses having walls containing alveoles in communication with the attenuable material, each boss having a bottom wall having a substantially continuous surface. The alveoles have plural orifices extending through the bottom walls. It is contemplated to concurrently draw at least one filament from each alveole, independently of each other alveole, regardless of whether or not said material has flooded the bottom surface surrounding the orifices communicating with any individual alveole.

An important feature of the present invention is the deliberate and controlled flooding of a multiplicity of fiber forming regions, established by the bosses above referred to, each of which is provided with a plurality of orifices; this arrangement providing for isolation of the orifices in one boss from the orifices in the other bosses. This in turn enables the deliberate and controlled flooding which is used for several different purposes. For example, it is used during the start-up of a winding operation so that the operator need handle only a relatively small and managable number of filaments as compared with the total number of fiber forming orifices in the bushing bottom, regardless of whether the start-up is being effected to produce one filament from each orifice or to produce a larger single filament from each alveole.

The controlled and deliberate flooding is thus used to provide for selective production of one or a plurality of filaments from each of the multiplicity of fiber forming regions.

Still further, the controlled restriction of flooding to a limited number of fiber forming orifices facilitates the use of the invention in applications where end products such as rovings or chopped strand are directly formed from molten glass without manual intervention, that is, in so called in-line transformation applications. As an example, if there are four fiber forming orifices in each region and each such region is isolated from other regions, and if a single filament issuing from one of the orifices breaks, flooding will be confined to a total of four orifices and the fiberizing operation may be continued without any interruption. Flooding of the orifices communicating with one alveole may stop after the glass flowing from two or three orifices is combined and frequently while fiberization of glass issuing from the other alveoles continues, a single fiber from the four orifices of the flooded region is formed having a diameter which is about twice the diameter of the individual fibers issuing from the four orifices. In the context of a bushing having several thousand orifices, continued production with one or a few filaments having a diameter up to twice the size of the remainder of the filaments will have no material impact on the quality of the strand produced so that the operator need not interrupt the winding operation when a limited number of breaks occur.

One of the objects of the invention is to maintain the group of orifices of the bushing base plate and the glass issuing therefrom at a temperature which is the most stable and the most uniform value possible, and to control the cooling of the glass at the exit of each orifice, that is to say at the level of the filament-forming bulbs, so as to separate efficiently and selectively, these bulbs during filament formation.

In addition, the present invention provides for good fiberization stability even for the manufacture of filaments with small diameters, and this without the numerous disadvantages encountered in known processes or apparatus. Various of these factors, especially the capability of using a high number of orifices per unit of surface area and the improvement of the fiberization stability, enable the manufacturing yield to be increased considerably.

In one of its aspects, the invention involves regulating the flooding of the bottom surface of each boss defining the floor of each alveole by controlling the cooling of the attenuable material delivered into the orifices through the bottom wall of said boss.

In accordance with another aspect of the invention, the cooling is controlled to provide for flooding of the bottom surface of the boss defining the floor of each alveole thereby establishing formation of a single filament from all of the orifices of each of said alveoles.

In accordance with still another aspect of the invention, after establishment of the single filament, the cooling is controlled to effect a separation of glass forming the single filament into separate filaments, one from each orifice of each of said alveoles.

A typical start-up process according to the invention comprises flowing the molten material through a bushing of which the base is made of a plate containing a series of bosses, each equipped with a plurality of orifices through its bottom wall; flowing the molten material through the said orifices and covering the underside of the said bottom walls by forming one globular mass per alveole; drawing one primary stream per alveole; and directing a gas current onto the said bosses and thus causing the subdivision of each primary stream into as many elementary filaments as there are orifices, combining filaments to form at least one strand wound onto a rotary support and continuing the attenuation of the elementary filaments in the absence of the gas current used during the starting procedure.

In accordance with the invention, one means of cooling the glass is by thermal exchange between the walls of the bosses and the ambient gases circulating through the grooves separating the said bosses, and carried along by the filaments during attenuation.

This cooling of the glass has the effect of reducing the temperature variations existing at the level of the bushing orifices, and increasing the viscosity of the glass leaving the orifices.

Preferably, cooling elements such as fins, placed near the bosses are used to compensate for thermal imbalances of the bushing at the level of the orifices which would adversely affect the fiberization stability, and which may still exist despite cooling by thermal exchange with the ambient gases. Heat radiated from the bosses and the glass to the fins is transferred by conduction to manifold means containing a liquid coolant. Cooling may be regulated according to the temperatures of the molten glass at the exit of the various orifices.

This cooling achieves such a uniformity of temperature and a stable condition of fiberization, that use of a continuous high volume and high velocity blowing of air or gas toward the bushing is unnecessary.

The cooling particularly results from thermal exchanges by radiant heat transfer between the walls of the bosses and the cooling elements, and induces different drops in temperature between the levels of entry of the glass into the alveoles and the undersides of the bosses depending upon differences in the temperature at the points of entry of glass into different alveoles.

The drops in temperature can be regulated to achieve uniformity of temperature at the bushing base, in particular, by positioning the cooling elements or a part of the elements of the cooling means in grooves separating the bosses and by placing them at varying heights in relation to the bottoms of the bosses.

According to one characterisitic of the invention, the drop in temperature thus created between the levels of entry ($P_E$) of the molten material into an alveole and the undersurface of the corresponding boss or fiberization level ($P_F$), has a value at least equal to 20° C. For the fiberization of glass or of similar thermoplastic materials, the drops in temperature in the various alveoles will advantageously range between about 20° and about 140° C. and preferably between about 30° and about 90° C.

According to another characteristic of the invention, the temperature of the glass in the orifices of a boss is practically equal to the temperature of the metal directly adjacent to each orifice. This temperature itself, is lower than the temperature of the region of the bushing at the upper edges of the alveoles.

The cooling of the bosses and glass bulbs by radiant heat transfer, possibly controlled by adjustment of the position of the cooling elements, is a function of the dimensional characteristics of the bushing. The characteristics having significant influence on these thermal exchanges are, in particular, the height of the bosses and the thickness of various walls as stated hereafter.

From an electrical point of view, the boss-type bushing bottom has a similarity to tipped bushing bottoms in that it provides plural paths between and around the bosses having substantially equal electrical resistance characteristics so that a uniformity of temperature is achieved without the disadvantages and complications which are inherent in the tipped bushing configuration. Bosses having relatively thin bottom wall sections can be produced, thereby minimizing the friction effect on the glass as it flows through the orifices. The reduction of the friction effect through the orifices as compared with tips is especially significant.

An alternate embodiment illustrated contemplates the provision of elongated bosses separated by downwardly open channels. Each boss is provided with a plurality of spaced apart cells or alveoles. A plurality of orifices in the bottoms of the bosses communicate with each alveole. The alveoles within each boss may be arranged in one or more rows.

In the alternate embodiment just referred to, shallow grooves may be provided in the base or bottom of each boss to prevent flooding of the molten material issuing from the orifices in communication with one alveole to the molten material issuing from the orifices in communication with adjacent alveoles.

One of the important characteristics of the invention is the ability to manufacture, from the same bushing, strands made of n or of N elementary filaments (N being a larger number than n) by controlling the fiberization conditions in a unique manner. This is preferably accomplished by regulation of the cooling such as by use of a low volume, low velocity gas current sweeping the bushing base, which regulates the drop in temperature induced in the alveoles and also by regulation of the drawing speed of the filaments.

In accordance with this technique, when one desires to go from a strand made of N filaments to a strand containing n filaments, at the time of re-start the flooding of the underside of each boss is maintained by the absence of the blowing of gas on the bushing base, thereby modifying the fiberization parameters by reducing the induced drop in temperature in the alveoles.

When it is desired to change from n to N filaments, a gas current is used at the time of the restart and the parameters of fiberization are modified to increase the drop in temperature in the alveoles.

It is important to note that after this change the diameter of the filaments can be made smaller even if the drawing speed of the filaments is decreased.

Among the various other advantages brought about by the present invention, one of the more notable is the control of the flooding of the perforated zones, which give the bushings an exceptional flexibility of utilization; thus, at the time of the re-start, the operator manipulates only a relatively small number of elementary filaments (only as many as there are alveoles), and can very rapidly obtain a strand made of n or of N filaments by use of selected parameters of fiberization.

Further, the wide variety of strands suitable for manufacture from a given bushing, and particularly the possibility of drawing filaments of fairly small diameter (for example 10 microns) at relatively low speed of drawing enables the direct formation of semi-finished products. It is therefore possible to manufacture, directly under the bushing, low yardage windings known as rovings. Another possibility is the direct feed of strand from a bushing to a chopper to manufacture chopped fibers.

It should also be noted that the rupture of a filament issued from an orifice does not necessarily cause an interruption in manufacture. In effect, if the glass flowing through the orifice is sufficiently hot, it will supply the bulbs of the other filaments issued from the same alveole, and the drawing can be continued with a lesser number of filaments being drawn from the alveole. For a bushing containing several thousand orifices, the formation of one or more filaments of larger cross-section will not affect materially the quality of the strand produced. Up to a reasonable number of breaks, so long as fiberization continues at the alveole having the filament rupture, the operator will not have to interrupt the fiberization operation, which is of particular advantage, especially during inline transformation of glass into finished products.

The present invention permits the manufacture of fibers at a fiberization temperature which, at the level of the orifices, is lower than with the classical process utilizing bushings with tips. For the fiberization of identical glasses, a result is an increase in the life of the bushing.

Since the glass has a relatively low temperature at the exit of the orifices, in the event of a filament rupture, the flooding takes place more slowly and in any event is readily limited to the single boss concerned.

This advantage enables the continuation of the fiberization operation without interruption to the end of the winding operation and, therefore, the increase in the number of full bobbins.

The molten glass feeder used in carrying out the invention comprises a glass supply source connected to a bushing whose base consists of a plate provided with series of bosses separated by spaces, the undersurface of each boss being perforated with a plurality of orifices. It also preferably includes at least one blowing manifold placed laterally below the bushing base as well as elements for attenuation and sizing of the glass filaments. It preferably further comprises, in combination with this plate, cooling elements or fins, in proximity to the bosses. The shape of the bosses, their size and spacing are such that, taking into consideration the heat exchange with the ambient gases entrained by the filaments during the attenuation phase and the heat exchange by radiation to the fins, temperature drops at least equal to 20° C. are created between the entry level ($P_E$) of the molten glass into an alveole and the undersurface of the boss, that is, at the fiberizing level ($P_F$). The dimensional parameters referred to above are calculated for each bushing as a function of the desired temperature drop in an alveole, knowing that the mean value is preferably on the order of 10 to 20° C. per millimeter of glass height within the alveole, using ($P_E$) as the starting point.

The undersurface of each of the bosses is preferably substantially continuous. In one embodiment of the invention the orifices perforated therein are provided in a regular pattern with respect to the vertical axis bisecting said surface, being symmetrical with respect to this axis.

When one filament per alveole is drawn, this arrangement of the orifices produces a more uniform flow of glass supplying the bulb of the said filament.

In accordance with one embodiment of the apparatus, the bosses have vertical walls and their exterior section is square.

In accordance with another embodiment of the apparatus, the bosses have vertical walls and their exterior section is circular.

In accordance with one of the characteristics of the invention, the bosses are arranged in regular intervals in groups, each group formed in at least one row extending at a right angle to the longitudinal axis of the bushing. The distance between two consecutive groups is such that a cooling element may be inserted with space on each side of the element to allow for air flow. When the group is made up of at least two rows, the bosses of the rows are preferably staggered with respect to one another.

The cooling apparatus likely to be connected to the bushing preferably comprises a series of elongated elements cooled by conduction or convection or both. In a preferred form, a multiplicity of thin conventional fins soldered to at least one hollow body cooled by a fluid are employed.

Furthermore, the placement and dimensions of the bosses form a network of baffles at the base of the bushing, which guide and direct the air currents induced by the attenuation of the glass, reduce turbulence and contribute to the stabilizing of the bulbs. This effect is reinforced by the presence of the cooling fins.

Preferred fiberization apparatus and method in accordance with the invention are described in detail hereinafter and illustrated by the following drawings:

FIG. 1 is a schematic frontal overview of an apparatus used for mechanical attenuation of continuous fibers by winding onto a high speed spindle, including a bushing of the invention;

FIG. 2 is a transverse section of part of the bushing base shown in FIG. 1;

FIG. 3 is a longitudinal section of part of the bushing base shown in FIG. 1;

Figure 9:
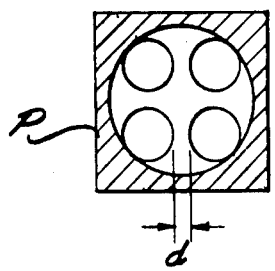
Figure 10:
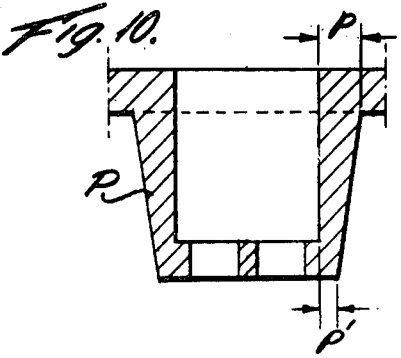
Figure 11:
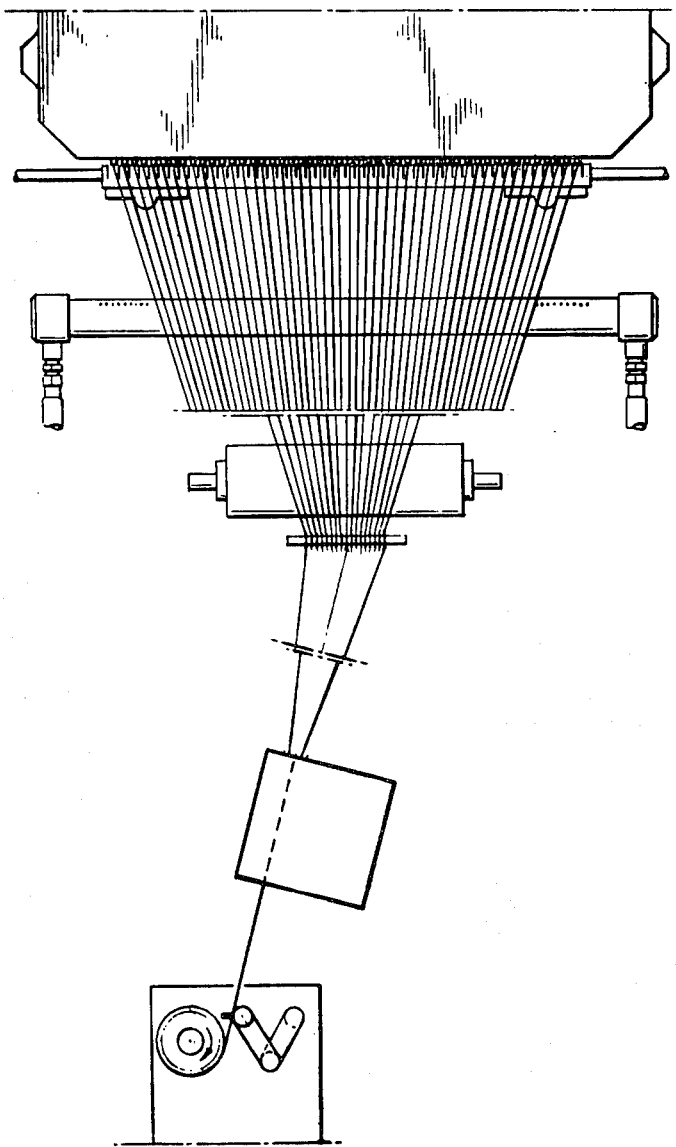
Figure 12:
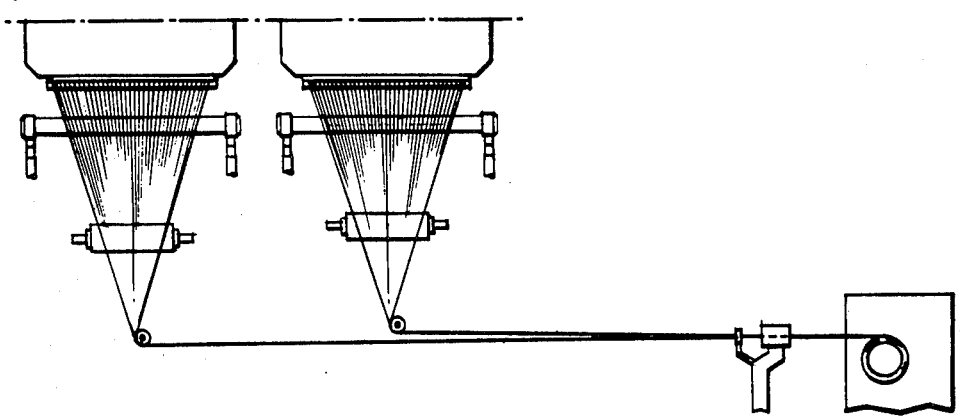
Figure 13:
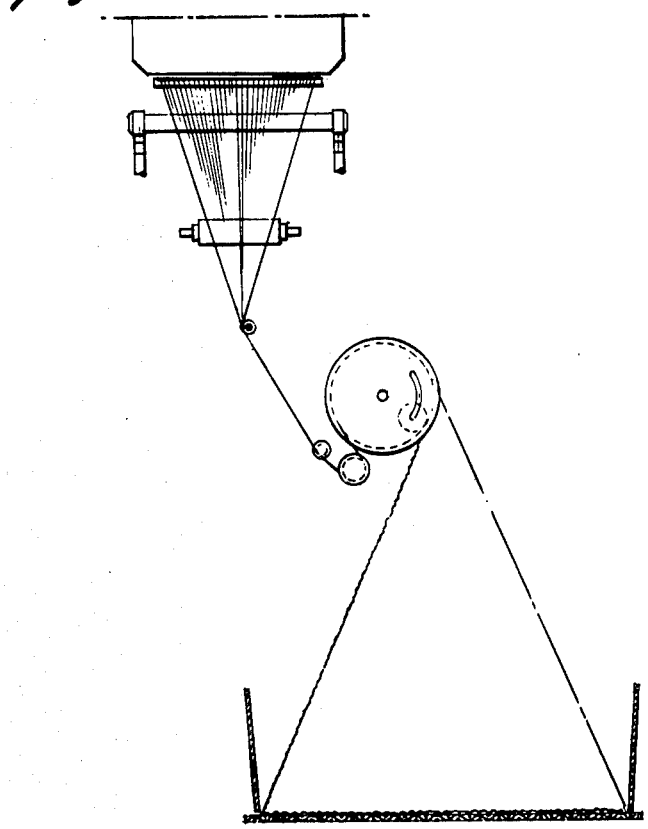
Figure 14:
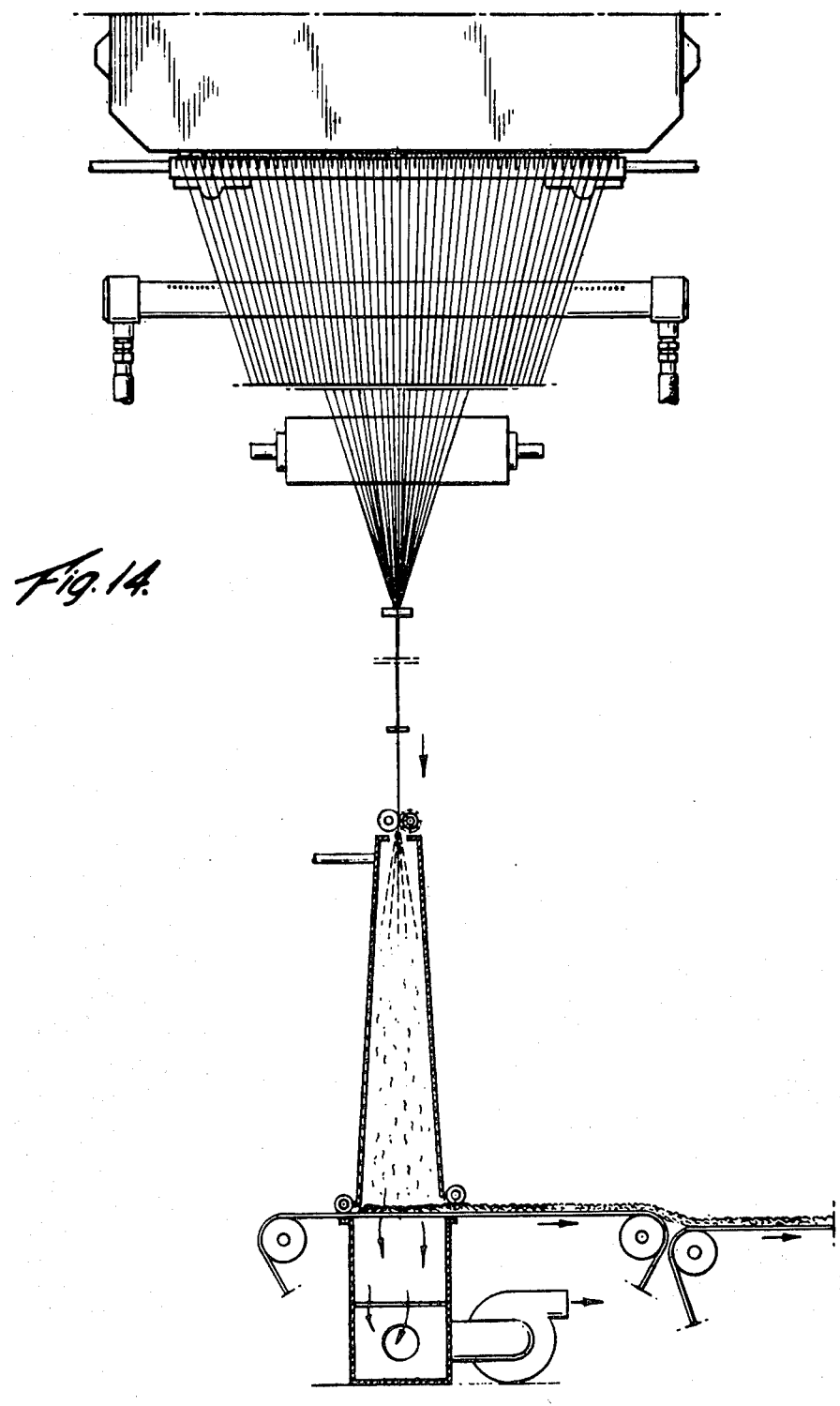
Figure 15:
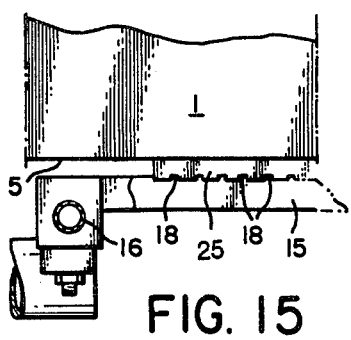
Figure 17:
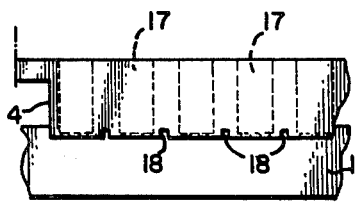
Figure 20:
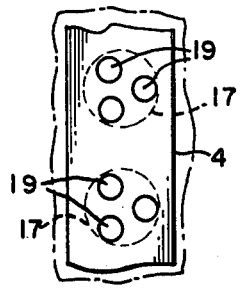
Figure 16:
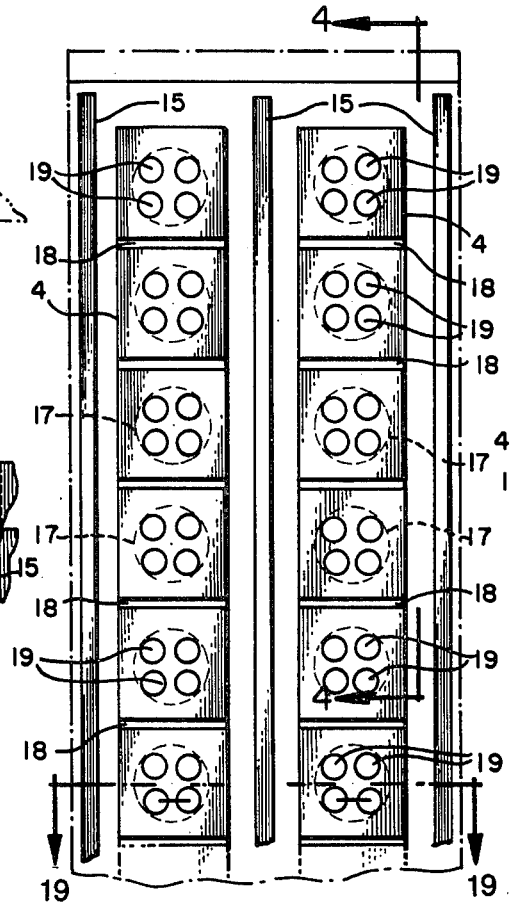
Figure 18:
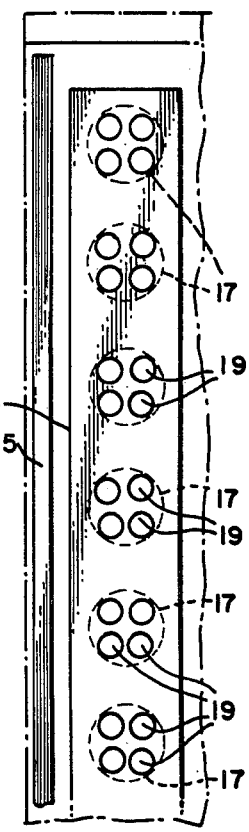
Figure 19:
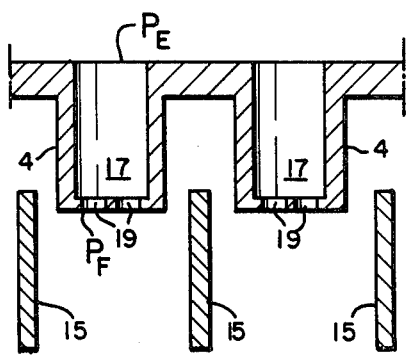
Figure 21:
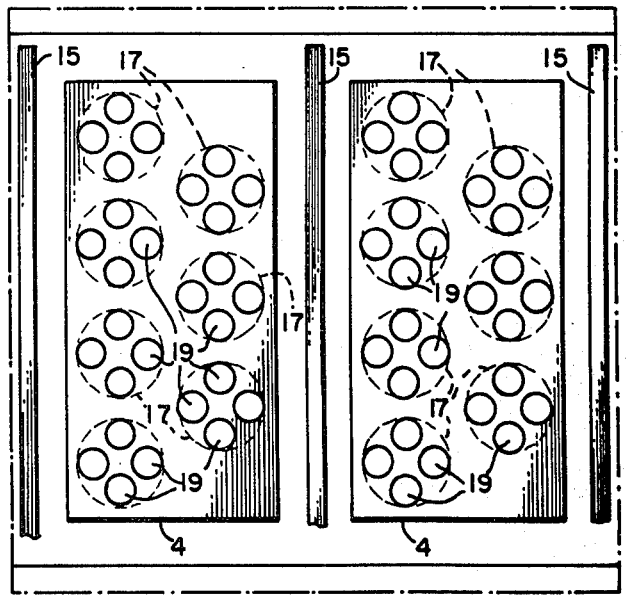
Figure 22A:
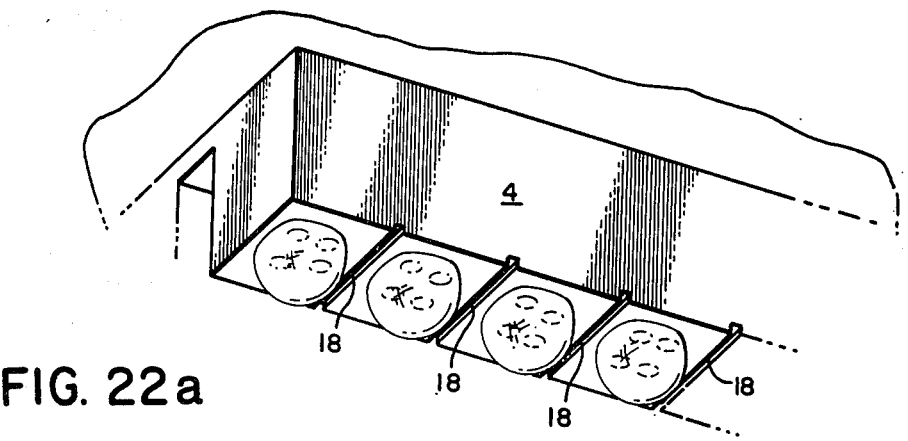
Figure 22B:
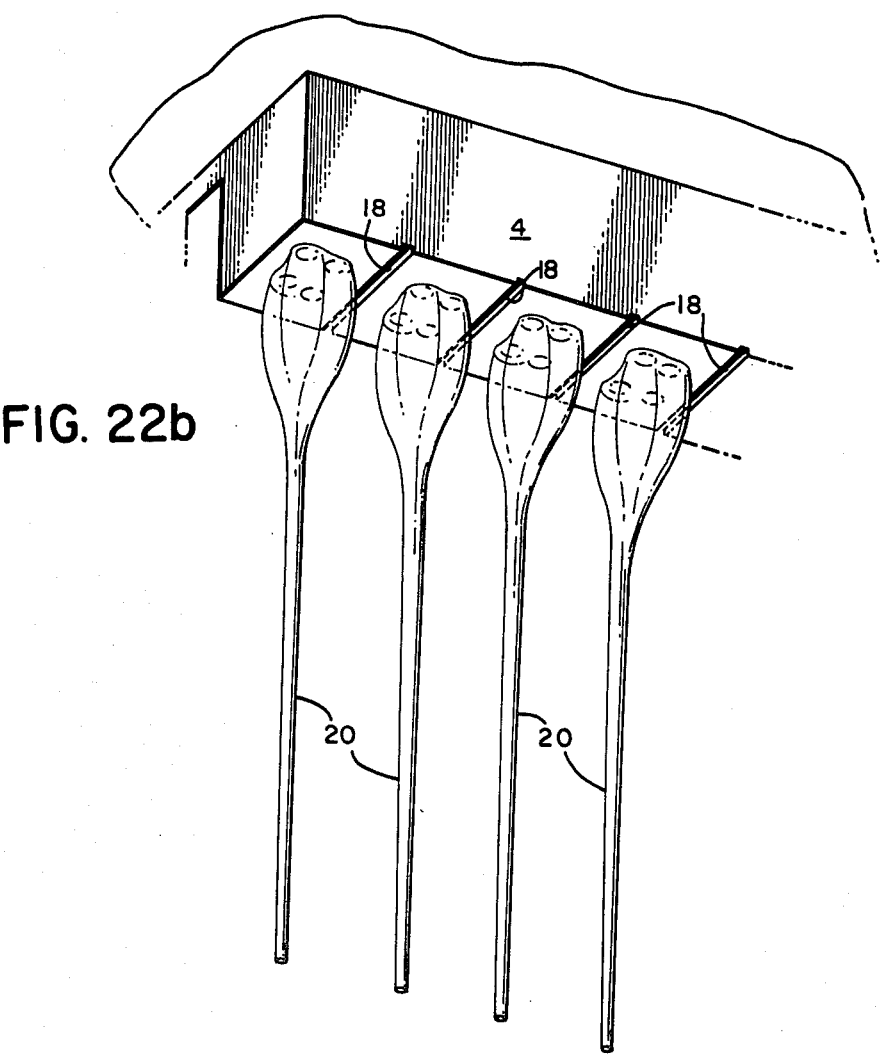
Figure 22C:
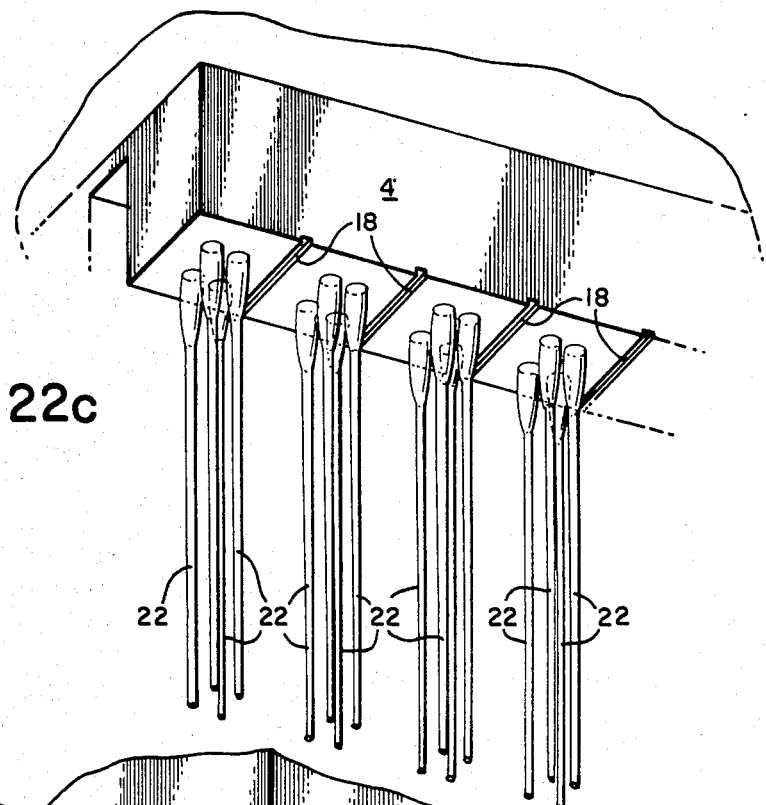
Figure 23:
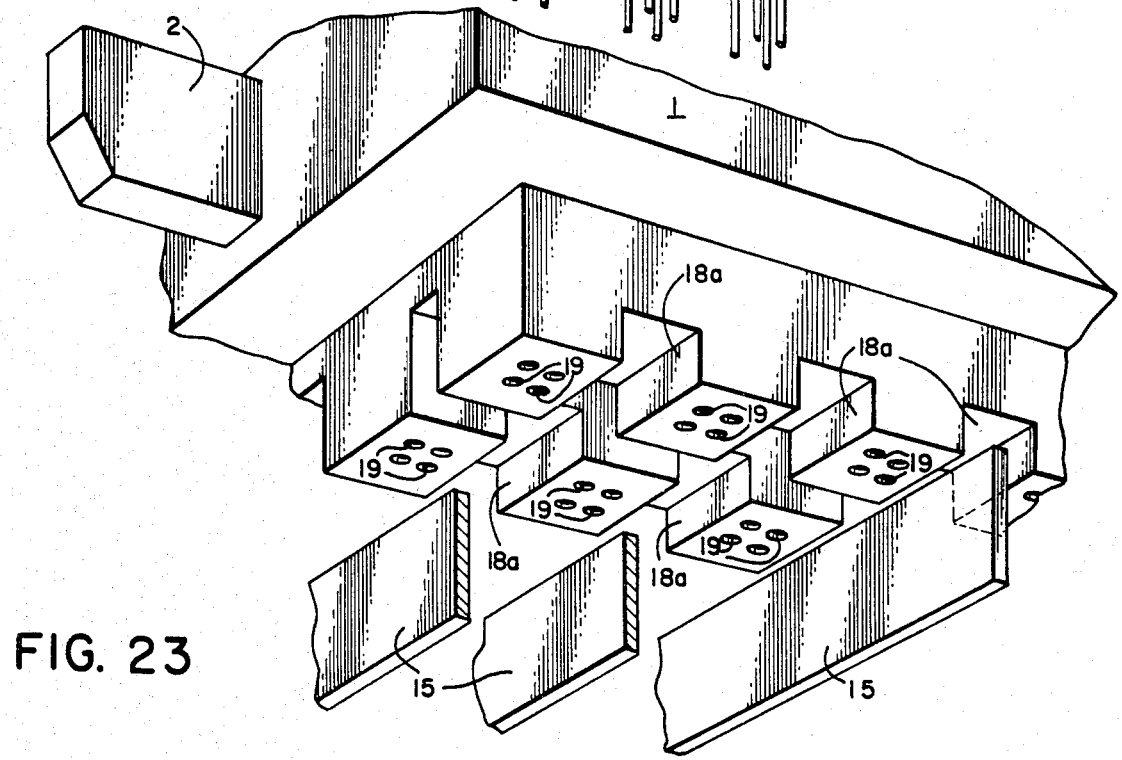

FIGS. 4A, B, C and D illustrate the various phases of starting a bushing according to the invention;

FIG. 4E is a view similar to FIG. 4D, illustrating a condition of operation in which a single filament is drawn from one boss and plural filaments are drawn from other bosses;

FIGS. 5, 6, 7 and 7a are partial plan views of the base of various bushing base configurations according to the invention;

FIG. 8 is a longitudinal cross-section of the bushing base, taken on line 8—8 of FIG. 5;

FIG. 9 is a horizontal cross-section of one of the bosses shown in FIGS. 5 and 8, taken on line 9—9 of FIG. 8;

FIG. 10 is a vertical cross-section of a modified form of boss;

FIGS. 11 and 12 show full, schematic front views of installations for direct manufacture of roving packages;

FIG. 13 shows a full, schematic front view of an installation for direct manufacture of continuous mat strands;

FIG. 14 shows a full, schematic front view of an installation for direct manufacture of a blanket of chopped fibers;

FIG. 15 is a transverse section of a portion of a modified form of the bushing base shown in FIG. 1;

FIG. 16 is a plan view on an enlarged scale of a part of the bushing base of FIG. 15;

FIG. 17 is a sectional view, on a reduced scale with respect to FIG. 16, of the bottom of the bushing taken on line 17—17 of FIG. 16;

FIG. 18 is a plan view similar to FIG. 16 but illustrating another modified form of the invention;

FIG. 19 is a longitudinal cross section of a bushing base taken along line 19—19 of FIG. 16;

FIG. 20 is a fragmentary view of a portion of a boss having three orifices in communication with each alveole;

FIG. 21 is a view similar to FIG. 16 showing another modified form of the invention;

FIG. 22a through 22c are perspective views showing steps in the drawing of filaments utilizing the alternate form of apparatus and techniques of the invention; and FIG. 23 is a perspective view of a further embodiment of bushing bottom incorporating the principles of the invention.

DETAILED DESCRIPTION OF THE INVENTION

FIG. 1 shows, by way of example, the overall configuration of a fiberizing apparatus for forming glass fibers from glass in attenuable form and includes a bushing incorporating the principles of the invention.

Bushing 1, made for example from an alloy of Pt 90%, Rh 10%, is equipped with terminals 2 for the supply of electrical current used for heating by the joule effect. It contains molten glass flowing from orifices grouped in fiber forming regions on the undersurface of a series of cellular members termed bosses 4 preferably formed of the same alloy as the bushing and projecting from the base of plate 5. The bushing is supplied with glass from a known glass supply source which can be the forehearth of a direct melt oven from which the glass flows into the bushing in molten condition or even a supply system delivering the glass as marbles, the latter being remelted in the bushing. Regardless of the supply source used, the flow of molten glass through the orifices is ensured primarily by the hydrostatic pressure of the molten mass located above the base plate. The glass is attenuated into elementary filaments 6 by suitable means such as a revolving spindle 7. In the manufacture of glass fiber strand, after application of sizing by means of a sizing pad, shown at 8, the filaments are gathered into one or more strands 9 by the means usually employed in this technique, such as combs 10 and 11. The strand is then wound around the revolving spindle 7 along which the strand is distributed lengthwise of the spindle by means of a distribution means such as the helical guide 12.

A blowing manifold 13, shown in FIGS. 1 and 4C, is mounted adjacent to and below the fiberizing level, and is provided with a series of openings 14, the openings being directed toward the bushing base. The openings can be provided with nozzles or take the form of simple orifices, placed closely together and parallel to the longitudinal axis of the bushing.

The manifold 13 is provided with a row of orifices of 1 mm in diameter and of which the distance between axes is 2 mm. The length of the row is at least equal to that of the length of the bushing.

This manifold is placed below the fiberization level at a suitable distance, as for example between 100 and 160 mm from the longitudinal axis of the said fiberization level.

It can be stationary or rotary mounted; in the latter case its rotation speed can be on the order of 2 to 3 rotations per second so as to assure a uniform and complete blowing of the fiberization level. Means for rotating the manifold are shown schematically at 13a. The rotation of the manifold assures that the entire base of the bushing is swept with gas during start-up and re-starting of the bushing. The periodic delivery of the gas produces a periodic variation in temperature and viscosity of the glass adjacent the orifices.

Other methods of blowing can be employed. For example, the gas current can thus be delivered by a simple flexible tube having a large diameter, directed and manually displaced toward the bushing base, or by several stationary tubes of large diameter.

The manifold 13, connected to a source of gas under pressure, not shown, provides for delivery of a current of gas at the time of the start of the fiberization operation, as explained hereafter:

In addition to cooling by thermal exchange between the bosses and the ambient gases circulated between the grooves separating the bosses, it is preferred that cooling apparatus, partially shown in FIG. 2 and 3, and preferably of the fin cooling type be provided. The fins 15 are connected to at least one main tube or manifold 16 in which a cooling fluid, such as water, circulates. These fins are preferably constructed of metals having a good thermal conductivity.

In the embodiments shown in FIGS. 5 and 6, the fins 15 are preferably provided adjacent the spaces separating consecutive rows and can be individually adjusted to permit partial projection of the fins into these spaces to foster production of the desired temperatures around the fiberization orifices.

The start-up of bushings in accordance with the invention, is illustrated by reference to FIGS. 4a, 4b, 4c and 4d which show a group of bosses projecting downwardly from a bushing bottom. This sequence of Figures illustrates the mode of operation employed when it is desired to form one filament from each orifice of an alveole.

The molten glass supplying bushing 1 passes into the alveoles formed by bosses 4, flows through the different orifices 3 perforated on the undersurface of each of the bosses and rapidly floods said surface as illustrated in FIG. 4a. The flow causes formation of one single globular mass 20 per alveole which descends gradually as a result of its own weight, entraining in its wake a single stream of glass called a primary stream 21 illustrated in FIG. 4b.

The primary streams 21 so formed are manually collected and low speed mechanical attenuation is instituted.

As shown in FIG. 4c, a gas current, preferably of air at a low pressure is then delivered to the bushing. By way of example, in a typical case, air pressure is equal to 100 mm of water. For a bushing of which the base has a surface of about 250 $cm^2$, the output of air delivered is comprised between 0.1 and 1 $m^3$ per minute. The output rate of the air at the level of the bushing base is a few meters per second, for example from 1 to 10 m/sec.

Subdivision of each primary stream 21 into as many elementary filaments 22 as there are orifices at the base of each alveole is therefore produced instantaneously. Separation of the cone of glass issuing from the four orifices into four streams which constitute the beginnings of four elementary filaments 22 is illustrated in FIGS. 4c. In FIG. 4d, the supply of blowing gas from the manifold has been interrupted and the four filaments are being attenuated.

The elementary filaments 22 are gathered into at least one strand and wound on a revolving spindle and filament attenuation proceeds. Preferably the gaseous current is maintained until the start of formation of the package at which point it is terminated.

When a rotary blowing device is employed, the glass issuing from the orifices is periodically cooled as the glass cones are swept by the gas. Preferably the glass is alternately pulled by the operator and cooled by the gas during the starting procedure.

When it is desired to draw one filament per alveole, substantially the same operatory cycle is used except that the action of the gas current is eliminated; one elementary filament per alveole as shown in FIG. 4b is thus obtained.

Although it is preferred that the gas current be terminated once fiberization has begun, since the speed of the gas current is so low, it is possible, although unnecessary when drawing a filament from each orifice as in FIGS. 4c and 4d, to maintain it during the entire fiberization operation.

FIG. 4e illustrates a condition of operation which occurs when filament breakage has occurred at one alveole. When one filament breaks, the glass issuing from the orifice where breakage occurred will flood over the surface of the boss beneath the alveole and combine with the glass flowing from one or more of the other orifices from the same alveole. Since the glass cannot bridge the gap between alveoles, at the most the result is that flooding is confined to glass flowing from a single alveole and the glass issuing from the four orifices will produce a single filament having a diameter larger than the diameter of the filaments issuing from the other alveoles. As noted above, the presence of a few larger filaments being drawn from the bushing will not affect the quality of the end product so that an interruption of the fiberizing operation is not required.

By way of example, FIGS. 5 and 6 show bosses with 4 and 7 orifices respectively. It is possible to increase or decrease the number of orifices per alveole, depending particularly on the size of the alveoles, the diameter of the orifices, and the interaxial distances.

The number of orifices selected is the result of a compromise between the best possible orifice density and good bulb separation during the entire fiberizing process.

Regardless of the number of orifices selected, it is to be noted that the centers of said orifices are advantageously located regularly on concentric circles, which have the center on the vertical axis of the alveole. This center can also be the center of a central orifice. The edge-to-edge distance of the orifices may vary from 1 to 0.2 mm or less, but is preferably between 0.2 and 0.5 mm.

The bosses may be arranged in single rows or in double rows at a right angle to the longitudinal axis of the bushing base, as shown in FIG. 5.

The bosses in each row in FIGS. 5 and 6 are separated by grooves. The spacing "a" between bosses should be at least equal to 0.1 mm, but preferably between 0.4 and 1 mm. It is preferred that the spacing "b" maintained between rows, as shown in FIG. 5, be greater than the thickness of the cooling fins in order to accommodate the fins, with space at each side for air flow. Therefore "b" typically can vary between 2.5 and 5.5 mm and preferably between about 3.5 and 4 mm.

FIGS. 5 to 7 show bosses of cubical or circular shape. Other shaped bosses may be employed to the extent that they can be arranged in compact groups.

FIG. 7 illustrates an embodiment wherein fins are spaced between every other row of bosses. In the embodiment of FIG. 7 the bosses are staggered in order to maximize the radiant heat transfer between the sides of the bosses which are not immediately next to a fin and the fins themselves. Still another advantage of the staggered arrangement is that it permits an increase in the density of bosses. The cylindrical form of boss is of advantage when the staggered arrangement is employed in that it permits a close spacing of the bosses. To increase the boss density, the distance "c" of FIG. 7 may be quite small and may even be a negative number.

FIG. 7a illustrates a cylindrical form of boss wherein each boss is provided with three orifices. The bosses may be staggered as in FIG. 7 and fins may be arranged between every row as in FIGS. 5 and 6 or between alternate rows as in FIG. 7.

One particular advantage in the use of bosses, whether the bosses in a particular series are separated by grooves or not, is that the main electrical current flows essentially in the base plate between the bosses, rather than in the walls of the bosses. It results, particularly that the thickness of the underside of the bosses can be chosen independently from the electrical characteristics of the bushing as a whole. Thereby the bushing with bosses presents electrical characteristics similar to those of the classical bases with tips, without presenting the disadvantages. Preferably a large number of relatively small bosses are provided thereby yielding more unimpeded current paths than would be the case with large bosses in a bushing of given size.

Certain dimensional characteristics are illustrated in FIG. 8; these include thicknesses e and f corresponding respectively to the bases of the bushings and bosses, height h and thickness p of the sidewall of the latter.

The determination of these characteristics is essentially conditioned by the phenomenon of electrical energy dissipated by joule effect, the mechanical resistance of the bushing, the phenomena of thermal exchanges, the glass output per orifice and the number of orifices per surface unit.

For the purpose of imparting sufficent mechanical strength to the bushing base while using the least amount of metal possible, in a typical bushing the thickness e may vary from 0.5 to 3 mm and preferably from 1 to 2 mm.

This thickness, determined independently of the dimensional characteristics of a boss, can be different from one point to another in the bottom and is chosen so as to obtain the most homogeneous distribution possible of the electrical current on the entire bushing base.

The thickness of the bottom of a boss which partially conditions the output of glass can vary independently of the other dimensional characteristics; by choosing very small thicknesses, the resistance to flow within the orifices is reduced to the minimum, so that startup time is minimized and high output from orifices of small diameter can be obtained. This thickness f can vary from 0.2 to 2 mm and preferably from 0.4 to 1 mm, depending on the diameter of the orifices.

The degree of cooling of the glass within an alveole depends mainly on the height h and the thickness p of the wall of the corresponding boss.

Referring to FIGS. 9 and 10, the thickness p of the wall P can conveniently be constant, when the boss has a cylindrical wall configuration both internally and externally. It can also vary in the horizontal plane, when a boss having a cubic exterior has a cylindrical inner configuration, as shown in FIGS. 5 and 9. The thickness p can also vary uniformly in a vertical plane as shown in FIG. 10. In this case the thickness of the wall P will vary from the joining point of the boss with the bushing base to the underside of the said boss, from a value p to a value $p^1$, $p^1$ being less than p. This configuration provides for greater thermal conductivity at the top than at the bottom of each boss.

Generally for bushings formed according to the invention, h varies from 1 to 10 mm and p from 0.2 to 2 mm and preferably from 0.4 to 1 mm.

For an explanation of the effect of temperature conditioning within the alveoles, that is, the manner in which temperature differences existing in the glass as the glass enters different alveoles are minimized at the level where the glass exits from the alveoles, reference is made to FIG. 8. At level $P_E$, defined as the mean entry level of the glass into the alveoles, the respective glass temperatures at the entrance of two alveoles 1 and 2 are designated by $T_{E1}$ and $T_{E2}$ and the temperatures at the base of the corresponding bosses, around the orifices, i.e., at the mean fiberizing level $P_F$, are designated by $T_{F1}$ and $T_{F2}$. If $T_{E2}$ is greater than $T_{E1}$, all other parameters being constant, the temperature drop in alveole 2, $T_{N2} = T_{E2} - T_{F2}$, is greater than the temperature drop in alveole 1, $T_{N1} = T_{E1} - T_{F1}$, owing to the greater thermal exchange by radiation of heat and by convection.

Consequently the temperature difference at the mean fiberizing level, $T_F = T_{F2} - T_{F1}$, will be smaller than the temperature difference at the entry level of the alveoles $T_E = T_{E2} - T_{E1}$. This thermal damping effect, i.e., the reduction of the temperature difference, at the fiberizing level from the temperature differences at the entrance of the alveoles, becomes larger as there is an increase in the temperature drop in each alveole.

Although cooling fins may not be required, if the reduction in the differences in temperature at level $P_F$ is nevertheless insufficient, the bushing base configuration of the invention makes it possible to insert cooling fins 15, thereby controlling the desired drops in temperature in the various rows of alveoles.

The reduction in the range of temperature variations at the fiberization level $P_F$ is such that the constant use of cooling gas can be avoided and fiberization stability is at least as good as is obtained with tips, which facilitates the manufacture of filaments of small diameter and high yields. This very even temperature at the level of the orifices has the added advantage of decreasing unintentional variations in diameter of the filaments produced for an area of given fiberization temperature.

This reduction in the size range, along with the possibility of obtaining filaments of fairly small diameters, at relatively low pull rates, makes the bushing, according to the invention, particularly well suited for the manufacture of semifinished products.

FIGS. 11 to 14 illustrate examples of application of the invention.

The first illustrates the manufacture, directly under the bushing, of low yardage winding from a single bushing (FIG. 11) or from several bushings (FIG. 12).

The second illustrates the manufacture of mat from continuous strands issued by a plurality of bushings, according to an apparatus such as the one represented in FIG. 13, showing one of said bushings.

The third, concerning the manufacture of chopped fibers directly under the bushing, is illustrated in FIG. 14. This one shows an example of an installation enabling the continuous production of a blanket of chopped fibers.

Direct or in-line transformation of product from the bushing is facilitated because of the relatively few breaks which occur with bushings formed in accordance with teachings of the present invention and because relatively slow operating speeds are feasible.

In the detailed explanation of the embodiments illustrated in FIGS. 15-23, the bosses are preferably elongated and are each provided with one or more rows of upwardly open cells or alveoles which communicate with the supply of molten glass within the bushing. Preferably the bosses are formed of the same alloy as the bushing.

Turning to FIGS. 15-17 and 19, it can be seen that the elongated bosses 25 are of generally rectangular cross section with generally vertical side walls and planar bottom walls. Each is comprised of a row of spaced apart cells or alveoles 26 which communicate directly with the interior of the bushing. Although alveoles 26 may be formed in other ways which may lead to different cross sectional shapes, a preferred technique is to drill them out of the mass of material forming the bosses so that they have a circular cross section as viewed in FIG. 16.

The orifices in communication with each alveole are formed in clusters or groups, with each orifice of a group being equidistantly spaced from adjacent orifices in the same group. Each alveole shown in FIG. 16 is provided with a group of four fiber forming orifices extending through the planar wall portion in the bottom of the boss.

Orifice dimensions, distances between orifices and alveole dimensions are as set forth above in the description of the embodiments illustrated in FIGS. 3-10. The distance between adjacent orifices of adjacent clusters is more than 0.5 mm and preferably between 1.5 to 2.5 mm.

In the embodiment of FIGS. 15-17, shallow grooves extend transversely of the bottom walls of the bosses, between the alveoles 26. The grooves 27 provide a separation of the region of the bottom of the boss surrounding the orifices in communication with one alveole with the regions surrounding the orifices in adjacent alveoles in each boss.

Although the width and depth of the grooves 27 may vary somewhat, excellent results have been obtained using grooves having a width of between 0.5 and 1 mm and having a depth less than 1.5 mm and preferably of about 0.5 mm. Grooves so formed have been found to be effective in preventing the propagation of flooding of glass from the region surrounding the orifices of one alveole to the region surrounding the orifices of adjacent alveoles as will be explained more fully hereinafter.

FIG. 18 discloses an embodiment of the invention which is similar in construction to FIGS. 16 and 17 in that the alveoles 26 are formed in rows in bosses 25. According to the embodiment of FIG. 18, the bottom surfaces of the bosses are not provided with shallow grooves separating the regions beneath each alveole. In carrying out this embodiment of the invention, as compared with the embodiment of FIGS. 16 and 17, when the bushing is started up there is a flooding of the glass issuing through the orifices of one alveole to adjacent alveoles until a mass of glass is formed on the bottom of the boss. Tractive effort exerted on the mass of glass formed as a result of flooding together with periodic blowing is sufficient to individualize the flow of glass, first into one filament per alveole and then, if desired, into as many filaments as there are orifices.

Although in certain applications, the use of fin cooling devices may be eliminated, it is preferred that fins be employed and suitable fin structure is shown schematically in each of FIGS. 16 and 18. The relationship of the fins to the bosses and the alveoles can best be seen upon inspection of FIGS. 16, 18 and 19. The use of fins is in accordance with the teachings set forth in the description of the embodiments of FIGS. 2-10.

Although groups of four orifices are provided in the embodiments shown in FIGS. 16 and 18 it should be noted that the number of orifices may vary over a substantial range. A portion of a boss having three orifices per alveole is illustrated in FIG. 20. Seven orifices per alveole or even more may be employed.

Bosses having two rows of alveoles are illustrated in FIG. 21. When two rows of alveoles are provided, it is preferred that the alveoles in adjacent rows be placed in a staggered pattern in relation to one another.

Start-up of bushings of the type shown in FIGS. 15 through 17 is illustrated by reference to FIGS. 22a through 22c. As shown in these Figures, one elongated boss having a plurality of alveoles spaced in a row is shown for purposes of illustration but it is to be understood that in the preferred forms of the invention, a multiplicity of rows of bosses is provided with each boss having one or more rows of alveoles with a group of three or more orifices in communication with each alveole. The sequence of the Figures illustrates the mode of operation employed in the formation of one filament from each orifice of an alveole.

The molten glass supplying bushing 1 passes into the alveoles formed within each boss 25 and flows through each of the orifices 28 perforated on the underside of the bosses, rapidly flooding the surface as illustrated in FIG. 22a. The grooves 27 confine this flooding to the region of the bottom surface of the boss surrounding the orifices of one alveole from the region for the next alveole, thus preventing a propagation of flooding from one alveole to the next. The flow causes formation of a single globular mass per alveole which gradually falls as a result of its own weight, entraining in its wake a single stream of glass called a primary stream as illustrated in FIG. 22b.

The series of primary streams 29 so formed are manually collected and low speed mechanical attenuation is instituted.

A gas current, preferably of air at low pressure from source 13 of FIG. 1 is then delivered to the bushing base.

This results in a subdivision of each of the primary streams 29 into as many filaments 30 as there are orifices in the bottom of each alveole, this separation being illustrated in FIG. 22c.

The elementary filaments 30 are gathered into at least one strand and wound onto a revolving spindle or bobbin by the means illustrated in FIG. 1. Once separation is effected, the supply of blowing glass from the manifold may be interrupted and need not be utilized until it is needed to restart the bushing. However, it is preferred that the flow of gas current be maintained until the start of formation of the package.

It is preferred that the blowing device be rotatable about its axis by means schematically represented at 13a in FIG. 1. When a rotary blowing device is employed, the glass issuing from the orifices is periodically cooled as the gas cones are swept by gas during start-up. Preferably, the filaments of glass are alternately pulled by the operator and cooled by the gas during the starting procedure.

When it is desired to draw one filament per alveole, substantially the same operating cycle is used except that the action of the gas current is eliminated; one elementary filament per alveole as shown in FIG. 22b is thus obtained.

Although it is preferred in some applications that the gas current be terminated once fiberization has begun, for other applications it is desirable when drawing a filament from each orifice as in FIG. 22c, to maintain it during the entire fiberization operation.

By the above, reference is made to the fact that although it is preferred in some applications, for example when making fine diameter filaments at moderately high production rates, blowing may be discontinued after start-up but for other applications, for example when making large diameter filaments at very high production rates, blowing may be continued throughout the entire fiberizing operation.

When filament breakage occurs at one alveole, the glass issuing from the orifice where breakage occurs will flood from an orifice over the surface of the boss beneath the particular alveole and combine with the glass flowing from one or more of the other orifices from the same alveole. Since the glass cannot bridge the gap between alveoles, at the most the result is that flooding is confined to glass flowing from a single alveole and the glass issuing from the four orifices will produce a single filament having a diameter larger than the diameter of the filaments issuing from the other alveoles. As noted above, the presence of a few larger filaments being drawn from the bushing will not affect the quality of the end product so that an interruption of the fiberizing operation is not required.

FIG. 23 shows a modified form of invention which has similarities to FIGS. 5 and 6, 16 and 17. In FIG. 23, the longitudinal axes of the bosses are in parallel to the direction of current flowing from one to the other of the electric terminals 2, only one such terminal being shown in the Figure. Transverse grooves 27a, large enough to receive cooling fins, are provided in the bottom of the bosses between each alveole. In the illustrative embodiment, the transverse grooves 27a have a width of about 3.5 mm and a depth of 2.25 mm. Portions of fins 15 are illustrated in FIG. 23 so that the relation of the fins to the grooves can be seen.

Advantages of the method and various forms of apparatus described above may be seen from the following examples:

EXAMPLE 1

A bushing base is made of a metal plate of 90% platinum-10% rhodium and comprises 40 rows of bosses at the rate of 10 bosses per row, each boss being perforated with 4 orifices.

The arrangement of the bosses and the structure of the corresponding alveoles are those shown in FIGS. 5, 8 and 9. The various dimensions are the following:

bushing base = $380 \times 56$ mm
thickness $e = 1.5$ mm
distance between 2 bosses: $a = 1$ mm, $b = 3.5$ mm
cross section of the boss = $4.7 \times 4.7$ mm
height of the boss $h = 4.5$ mm
thicknesses: $f = 0.5$ mm, $p(\text{minimum}) = 0.35$ mm
diameter of the orifices = 1.6 mm
distance from edge to edge $d = 0.2$ mm According to one mode of operation, wherein four filaments are drawn from each boss, a strand of 900 tex, made up of 1600 elementary filaments of 17 microns diameter, is obtained with this bushing using a pull rate of 12 m/sec. The average fiberization temperature, measured by optical pyrometry, varies between 1130° and 1140° C. The drops in temperatures induced in the alveoles fluctuate between 80° and 90° C., the cooling fins being placed so that their upper extremity is located about 2 mm below the base of the bosses.

The rate of production per day is 890 kg.

According to the second mode of operation, wherein one filament is drawn per alveole, a strand of 1000 tex, made up of 400 elementary filaments of 36 microns diameter is obtained with the bushing at a pull rate of 10 m/sec.

The average fiberization temperature is between 1150° and 1160° C.

The drops in temperatures induced in the alveoles fluctuate between 60° and 70° C.

The rate of production per day is 890 kg.

EXAMPLE 2

The base of the bushing, made of the same alloy as in Example 1, comprises 32 rows of bosses at the rate of 7 bosses per row, each boss being perforated with 7 orifices.

The arrangement of the bosses and the distribution of the orifices are those shown in FIG. 6. Their structure is identical to that of the bosses described in Example 1, except for the number of orifices.

The various dimensional characteristics are the following:
bushing base = 380×58 mm
thickness e = 1.5 mm
distance between 2 bosses: a = 1 mm. b = 3.5 mm
cross-section of the boss = 6.4×6.4 mm
height of the boss h = 4.5 mm
thicknesses: f = 0.5 mm, p(minimum) = 0.5 mm
diameter of the orifices = 1.6 mm
distance from edge to edge = 0.3 mm The possibilities offered by this bushing of 1568 orifices for a pull rate corresponding to 900 kg/day are illustrated by the examples summarized in Table 1, reproduced hereinbelow.

TABLE 1

| No. of Filaments | Count (tex) | Filament Diameter (microns) | Drawing Speed (m/s) |
| --- | --- | --- | --- |
| 224 | 128 | 17 | 81 |
| 224 | 160 | 19 | 65 |
| 224 | 256 | 24 | 41 |
| 1568 | 311 | 10 | 33 |
| 1568 | 448 | 12 | 23 |
| 1568 | 900 | 17 | 12 |
| 1568 | 1792 | 24 | 6 |

EXAMPLE 3

In this example, the busing base is also made of 90% platinum-10% rhodium; it contains 52 rows of bosses at the rate 19 bosses per row, each boss being perforated with 4 orifices. The arrangement of the bosses and their structure are the ones shown in FIGS. 5, 8 and 9.

The dimensional characteristics of the bushing are the following:
bushing base = 463×111 mm
thickness e = 1.5 mm
distance between 2 bosses: a = 1 mm, b = 3.5 mm
cross-section of the boss = 4.7×4.7 mm
height of the boss h = 4.5 mm
thickness: f = 0.5 mm, p(minimum) = 0.35 mm
diameter of the orifices = 1.6 mm
distance from edge to edge = 0.2 mm The possibilities offered by this bushing of 3952 orifices for a theoretical pull rate of 2000 kg/day are illustrated through the manufacture examples summarized in the following Table 2.

TABLE 2

| No. of Filaments | Count (tex) | Filament Diameter (microns) | Drawing Speed (m/s) |
| --- | --- | --- | --- |
| 988 | 400 | 14 | 57,8 |
| 988 | 600 | 17 | 38,6 |
| 988 | 1200 | 24 | 19,2 |
| 3952 | 800 | 10 | 28,9 |
| 3952 | 1200 | 12 | 19,2 |
| 3952 | 2400 | 17 | 9,6 |
| 3952 | 4800 | 24 | 4,8 |

EXAMPLE 4

A bushing having the configuration of FIG. 16 was provided, having six alveoles of circular cross section machined in each of three solid bosses. Notches 0.5 mm deep and 0.5 mm wide were provided between the regions surrounding the orifices from each alveole. The bosses were 30.1 mm long and about 4.6 mm wide having a wall thickness of 0.5 mm at the bottom of each alveole. Orifices were 1.6 mm in diameter. The three rows of bosses were separated by grooves 3.5 mm wide. This bushing operated well with no flooding occurring from the bottom surface associated with one alveole to the surface associated with the next alveole. Results are shown in table 3.

EXAMPLE 5

This bushing, having the configuration of FIG. 18, comprised three bosses each having seven alveoles. The bosses were 33 mm long and 4.7 mm wide, were separated by grooves 3.5 mm wide, but were devoid of grooves between alveoles. In operation of this bushing after a breakage there is flooding on the bottom of a boss which propagates from the region beneath one alveole to the region beneath the next alveole; however traction on the glass is sufficient to again individualize flow into a single filament per alveole. Afterwards, blowing was used to effect separation into as many filaments as there are orifices. Operation was good. Average restart time following breakage was 2.1 minutes.

EXAMPLE 6

This bushing had the configuration of FIG. 21 with the rows of alveoles within each boss being staggered in relation to each other. Bosses were 8.8 mm wide and 18.9 mm long. The centerline to centerline distance of alveoles in a row was 4.7 mm. The centerline to centerline distance between rows was 4 mm. The rows of bosses were provided with three alveoles in one row and four alveoles in the next row. Alveoles were 4 mm in diameter; grooves 3.5 mm wide and 4.5 mm deep separated the bosses. Four orifices 1.6 mm in diameter were in communication with each alveole. The output per alveole was 230 mg/min. The output of this bushing was 220 mg/minute.

Results of operation of bushings of Examples 4–6 are tabulated below. For comparison purposes, results obtained with a bushing of the kind shown in FIGS. 2–10 are listed in the table in the column headed "TEM 4".

| TYPE OF BUSHING | TEM 4 | BUSHING of Ex. 2 | BUSHING of Ex. 3 | BUSHING of Ex. 1 |
| --- | --- | --- | --- | --- |
| Number of orifices* | $\frac{a}{3} \times \frac{b}{6} \times \frac{c}{4}$ | $\frac{a}{3} \times \frac{b}{7} \times \frac{c}{4}$ | $\frac{a}{3} \times \frac{b}{(4+3)} \times \frac{c}{4}$ | $\frac{a}{3} \times \frac{b}{6} \times \frac{c}{4}$ |

| TYPE OF BUSHING | | TEM 4 | BUSHING of Ex. 2 | BUSHING of Ex. 3 | BUSHING of Ex. 1 |
|---|---|---|---|---|---|
| Restart Time R | R max. | 4 mn | 3 mn | 4 mn | — |
| | R average | 2.2 mn | 2.1 mn | 2.8 mn | ≈2 mn |
| | R minim. | 1 mn | 1 mn | 2 mn | — |
| Temperature limitation of operation without flooding: $\Theta_L$ (bulb) | | 1168° C. | 1160° C. | 1160° C. | 1165° C. |
| Flow after a breakage at $\Theta_L$ | Formation of bulb | 40 s | 150 s | 110 s | 150 s |
| | Fall of bulb | 3 mn 40 s | more than 10 mn | 9 mm 40 s | 5 mn 30 s |
| Unitary pull rate at $\Theta_L$ in g/24 hr. | | 539 | 380 | 400 | 521 |
| Smallest filament diameter in microns | | 10.5 | 9 | 9 | 9 |

*a = no. of rows of bosses; b = alveoles in each row;
c = orifices per alveole

In summary, bushings according to the invention can be used in the production of large numbers of extremely fine fibers. High orifice densities are made possible. The bushings are simple to manufacture, have good structural rigidity and are characterized by good temperature stability and uniformity at the fiber forming orifices. As a consequence, fiber breakage is minimized and fibers of uniform diameter can be produced. Fibers as small as 8 microns in diameter can be produced with most fibers in a production run being of substantially the same diameter.

We claim:

1. A method for drawing attenuable material in attenuable condition, such as molten glass, into filaments, characterized by delivering the attenuable material in attenuable condition downwardly through a bushing the bottom of which has a plurality of series of bosses, each series comprising a multiplicity of bosses, each with a bottom wall having a plurality of orifices therethrough, and concurrently drawing one filament from each boss, and thereafter controlling the cooling to effect a separation of the attenuable material into individual filaments formed from the attenuable material delivered from each orifice of the bottom wall of each of said bosses.

2. Apparatus adapted for use in the drawing of attenuable material in attenuable condition, such as molten glass, into filaments, comprising a bushing and mechanism spaced below the bushing for drawing filaments from the material, said bushing having a chamber for attenuable material in attenuable condition and having a bottom wall with downwardly presented wall portions at higher and lower levels, the lower wall portions comprising bottom walls of bosses, the bosses being arranged in a plurality of parallel series and the lower walls of the bosses having orifices in communication with said chamber for delivery of said material, the orifices in the bottom of each boss comprising a clustered group of at least three orifices, the downwardly presented surface of each boss being substantially continuous throughout the region immediately surrounding the orifices and the spacing between the orifices being sufficiently close to maintain a condition of flooding of said material on the substantially continuous surface between the orifices in a boss under specific drawing temperature conditions, and thereby provide for drawing of a single filament from the flooded material from a boss, but the orifices being sufficiently spaced to maintain a non-flooded condition under other specific drawing temperature conditions and thereby provide for drawing of individual filaments from each orifice of said boss.

3. Apparatus according to claim 2, there being downwardly open channels between the series of bosses of sufficient depth to inhibit flooding of said material from the substantially continuous surface surrounding the orifices in one boss to that of other bosses.

4. Apparatus as defined in claim 2 wherein the orifices in each of said bosses are equidistantly spaced from the vertical axis extending through the center of each boss.

5. Apparatus as defined in claim 2 in which the downwardly presented surface of each boss is planar throughout the region immediately surrounding the orifices therethrough.

6. Apparatus as defined in claim 5 in which each boss is provided with a clustered group of at least three orifices.

7. Apparatus as defined in claim 5 wherein the channels surrounding the bosses extend from the downwardly presented wall portion at the lower level to the downwardly presented wall portion at the higher level.

8. Apparatus as defined in claim 7 characterized in that the edge-to-edge distance separating orifices on said bosses is less than about 1 mm.

9. Apparatus as defined in claim 2 wherein the bosses in adjacent series are staggered in relation to one another.

10. Apparatus as defined in claim 2 further including a blowing device spaced beneath said bushing, said blowing device having means for directing a current of gas to the region directly adjacent the orifices in the lower walls of said bosses.

11. Apparatus as defined in claim 2 and further including means for changing the fiberizing parameters during drawing of the filaments and thereby effect change between the drawing of a single filament from a boss to the drawing of plural filaments from a boss.

12. Apparatus according to claim 2 wherein the interaxial distance between adjacent orifices in a boss is not more than 2.1 mm.

13. Apparatus according to claim 2 in which the blowing device has means for directing a current of gas continuously to the region of the orifices in the bottom of the bosses.

14. Apparatus adapted for use in drawing of filaments from attenuable material in attenuable condition, such as molten glass, comprising a bushing having a chamber for the attenuable material in attenuable condition and having a bottom wall with downwardly presented wall portions at higher and lower levels, characterized in that the lower wall portions comprise bottom walls of bosses, the bosses being arranged in parallel series and each series comprising a multiplicity of spaced bosses, the higher wall portions of the bottom wall comprising a plurality of strip-like wall portions lying between series of bosses and extended between opposite edges of the bushing, means at said edges providing for attachment of electrical connections for effecting electrical resistance heating of the bushing by passage of current through said strip-like wall portions, the lower walls of the bosses each having a plurality of orifices for delivery of the attenuable material, and mechanism spaced below the bushing for drawing filaments from the attenuable material delivered through the bosses from said chamber, and downwardly open channels below said strips extended between the series of bosses and having side wall portions on the sides of said bosses forming said downwardly open channels, said side wall portions being of sufficient depth to inhibit flooding of the attenuable material from the substantially continuous bottom wall of one boss to that of other bosses in adjoining series.

15. A method of establishing filament flow from a bushing plate having bosses having a plurality of orifices therein which comprises:
   (a) flowing glass from a plurality of orifices in a bushing boss as a single fiber;
   (b) directing a cooling fluid into contact with the bottoms of the bosses of said bushing plate to cause said single fiber to separate into individual filaments issuing from each of said orifices; and,
   (c) discontinuing directing said cooling fluid into contact with the bosses of said bushing.

16. The method of claim 15 in which said bosses contain from about three to about seven orifices.

17. In a method of making glass filaments from a body of molten glass confined above a bushing base plate, said base plate having a plurality of individual bosses depending therefrom and each boss having a plurality of spaced orifices therein, said orifices of each said boss being so closely spaced from one another as to normally flood across the boss to form a single merged stream of molten glass issuing from all of the orifices at each individual boss, the improvement comprising directing a stream of cooling fluid at the bosses to impinge directly upon the merged stream of glass issuing therefrom, the fluid stream cooling the merged glass stream sufficiently to cause it to separate into individual molten glass cones each located at its own orifice, and thereafter drawing a glass filament from each cone.

18. In a method of starting a flooded glass filament bushing base plate, the base plate having a plurality of transversely and longitudinally spaced bosses, each of which is provided with a plurality of individual orifices so closely spaced as to flood with the molten glass from the individual orifices of each boss merging into a single stream substantially covering the lower face of the boss, the improvement comprising impinging a jet of fluid on the single merged stream at each boss for a period of time sufficient to separate the merged single stream into individual cones issuing from each orifice of the boss, and thereafter stopping the fluid impingement while concurrently drawing a filament from each cone.

19. A method of making glass filaments comprising drawing filaments from a plurality of bosses, each boss having a plurality of orifices therein, and, in the event of flooding of any boss, directing a stream of fluid toward the flooded boss for a period of time sufficient to separate the flooded glass of the flooded boss into individual filaments which can be drawn from the individual orifices, thereby reinstating the drawing of a filament from each orifice of the previously flooded boss.

20. A method of starting operation of a glass filament bushing, the base plate of which has a plurality of bosses each provided with a plurality of orifices, comprising the steps of flooding the base plate with glass issuing from each boss as a single stream in which the glass streams from the boss orifices merge into a composite glass filament, directing a fluid onto each composite glass filament to cool the same sufficiently to effect separation of the composite filament into separate cones located in each orifice, terminating the fluid once separation is effected and thereafter drawing a filament from each cone.

21. The method of decreasing beaddown time in a flooded glass filament bushing having an orificed bushing base plate, comprising merging together the molten glass from separate groups of orifices, drawing composite filaments from each of said groups of orifices, directing a cooling fluid onto the composite filaments adjacent the base plate to separate the composite filaments into their component filaments, each such filament being individual to one orifice, and drawing the individual filaments from the orifices.

22. The method of decreasing beaddown time in a glass filament bushing having a bushing base plate provided with isolated, individual boss, each boss having a plurality of orifices therethrough, said orifices being so closely spaced as to normally flood, comprising flooding the base plate to form a composite filament at each boss by merging together the molten glass issuing from the orifices of said boss, quenching the composite filament at each boss with fluid only to the extent necessary to separate the composite filaments into their component filaments, each such filament being individual to one orifice, and drawing individual filaments from the orifices.

* * * * *

UNITED STATES PATENT AND TRADEMARK OFFICE
CERTIFICATE OF CORRECTION

PATENT NO. : 4,469,499
DATED : September 4, 1984
INVENTOR(S) : J.Lecron/M.Manera/J.Faure/J.Renaudin It is certified that error appears in the above-identified patent and that said Letters Patent is hereby corrected as shown below:

Column 19, line 44, - change "busing" to --bushing--.

Column 19, line 46, - insert --of-- between "rate" and "19".

Columns 19 and 20, line 62, - insert --TABLE 3--.

Columns 21 and 22, line 12, - change "9 mm 40 s" to --9 mn 40 s--.

Signed and Sealed this

Second Day of April 1985

[SEAL]

Attest:

DONALD J. QUIGG

Attesting Officer

Acting Commissioner of Patents and Trademarks